United States Patent [19]

Hood et al.

[11] Patent Number: 5,213,555
[45] Date of Patent: May 25, 1993

[54] EXERCISE EQUIPMENT INFORMATION, COMMUNICATION AND DISPLAY SYSTEM

[76] Inventors: Robert L. Hood, 32380 Pine St., Grayslake, Ill. 60030; William H. Englehardt, 465 W. Dominican, Woodale, Ill. 60191; Russell W. Krch, 8231 W. 79th St., Apt. 2E, Justice, Ill. 60458

[21] Appl. No.: 485,700

[22] Filed: Feb. 27, 1990

[51] Int. Cl.$^5$ .............................................. A63B 21/00
[52] U.S. Cl. ......................................... 482/57; 482/902
[58] Field of Search ............... 272/69, 72, 73, DIG. 5; 273/16, 16 C, 16 E, 1 E, 138 A, 434–436; 364/264, 410, 411; 434/350, 84; 128/670, 689; 482/57, 52, 54, 72, 902

[56] References Cited

U.S. PATENT DOCUMENTS

| | | | |
|---|---|---|---|
| 1,525,278 | 2/1925 | Doglione | 272/73 |
| 3,729,193 | 4/1973 | Labis | 273/138 A |
| 4,278,095 | 7/1981 | Lapeyre | 128/689 |
| 4,408,613 | 10/1983 | Reylea | 128/670 |
| 4,542,897 | 9/1985 | Melton et al. | |
| 4,674,741 | 6/1987 | Pasierb, Jr. et al. | 272/129 X |
| 4,735,410 | 4/1988 | Nobuta | |
| 4,817,940 | 4/1989 | Shaw et al. | |
| 4,828,257 | 5/1989 | Dyer et al. | |
| 4,831,242 | 5/1989 | Englehardt et al. | |
| 4,842,266 | 6/1989 | Sweeney, Sr. et al. | |
| 4,919,416 | 4/1990 | DeCloux | 272/69 |

FOREIGN PATENT DOCUMENTS

| | | |
|---|---|---|
| 8705727 | 9/1987 | European Pat. Off. |
| 0255142 | 3/1988 | European Pat. Off. |
| 3706250 | 7/1988 | Fed. Rep. of Germany |
| 3629808 | 10/1988 | Fed. Rep. of Germany |
| 8500141 | 1/1987 | PCT Int'l Appl. |
| 8806776 | 9/1988 | PCT Int'l Appl. ................ 272/129 |

*Primary Examiner*—Richard J. Apley
*Assistant Examiner*—Glenn Richman
*Attorney, Agent, or Firm*—Jenner & Block

[57] ABSTRACT

An information, communication and control system for use in a health club which accumulates data from various types of exercise equipment and permits a number of exercise machines to be raced against one another. The exercise machines are equipped with keyboards from which users can enter data including their handicap (ability level) and the desired length of race. A central controller includes memory for storing data accumulated from the exercise machines and programs. The controller, responsive to the programs and input data, conducts a race between two or more exercise machines and displays the progress of the race on a video monitor. The controller can also be used to set up exercise programs for users on the various machines based on user performance data accumulated from the machines over time.

24 Claims, 21 Drawing Sheets

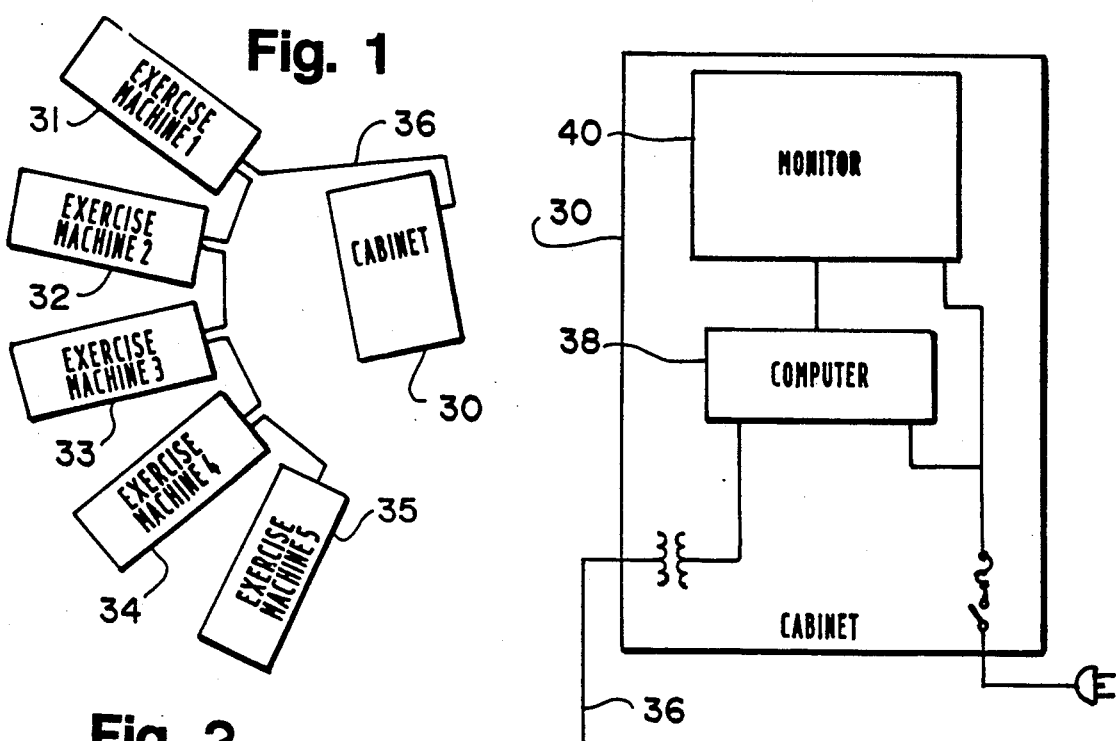
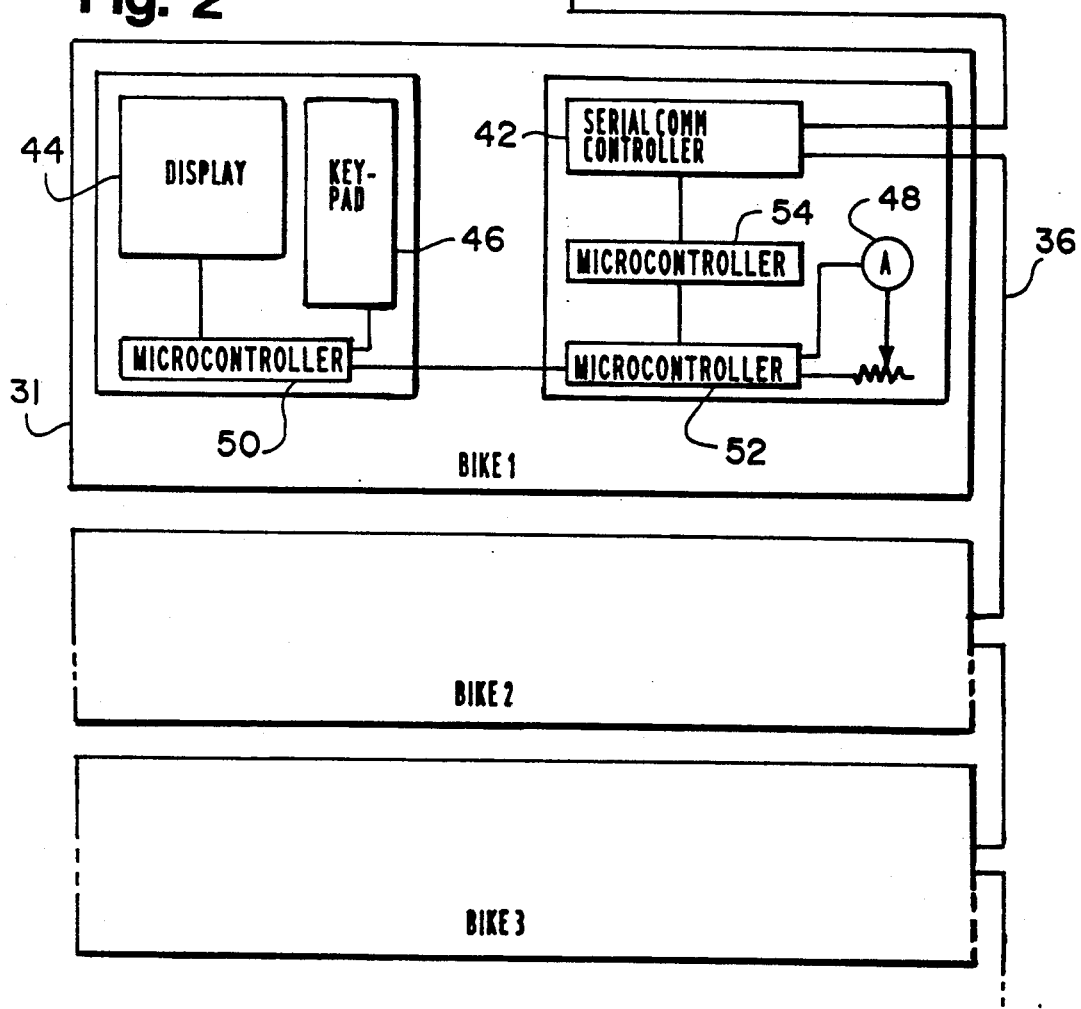

EXERCISE EQUIPMENT INFORMATION, COMMUNICATION AND DISPLAY SYSTEM

TECHNICAL FIELD

The present invention relates to exercise equipment control systems for health clubs and more particularly to a system which permits a number of exercise machines to be raced against one another and which accumulates data from various types of exercise equipment.

BACKGROUND OF THE INVENTION

Health clubs have become popular as people have sought a pleasant environment in which to exercise and socialize. Most health clubs offer various machines for aerobic exercise, including stationary bicycles, rowing machines and treadmills, as well as weight lifting machines. While such machines may provide a vigorous workout when properly used, they offer limited incentive and encouragement to the user to exert a maximum effort. The aerobic exercise machines are used individually and the user can only compete against himself. Also, the machines do not record the past performance of the user. Many users become bored with such repetitive exercise, and may eventually stop using the equipment, especially without the incentive of data which would show increases in the user's level of fitness over time.

SUMMARY OF THE INVENTION

It is therefore an object of the invention to provide a system that permits a number of participants using individual exercise machines to compete or race against one another over simulated courses, with the progress of the race displayed on a video monitor. Natural competitive instincts will encourage the racers to exert their best efforts, and the competitive nature of the race helps maintain interest and permits social interaction. The system is simple to operate so that races may be started without supervision or assistance by club personnel. A handicapping feature is provided so that individuals of differing fitness levels may enjoyably compete against one another. Any two or more of the exercise machines connected to the system may participate in the race, while the remaining machines may be used in their normal independent modes.

An additional object of the invention is to provide a system that includes a central controller or computer which generates graphic images for display on a video monitor. The graphics displayed on the monitor include an overview of a racecourse, a side view of the racers showing their relative positions, and a scoreboard area with speed, distance and other information for each racer. The central controller is interconnected to a group of exercise machines. Each exercise machine has a keyboard to input data to the central controller, such as desired length of race and the user's handicap. Each exercise machine also has a display for displaying information, including level of difficulty, elapsed time, and calories burned by the racer (the latter being calculated by the central controller).

Another object of the invention is to provide an integrated health club control system in which a health club controller is used to accumulate data including user and performance data from various types of exercise equipment including exercise bicycles, treadmills, stepclimbing machines, rowing machines and electronic weight machines. The health club controller can also be used to set up exercise programs for these types of equipment for individual club users and can be integrated with the race controller to provide information and data relating to individual user race performance over time.

In one embodiment of the invention, the exercise machines are computer controlled stationary bicycles. The keyboard on each bicycle permits the user to select a gear which determines speed and resistance. The racecourse consists of programmed hills and valleys based on a hill profile. Upcoming hills are shown on both the video monitor and the display on each bicycle. The grade of the hill, the selected gear, and the pedal velocity (RPMs) control the resistance felt by the user on the pedals of the bicycle.

BRIEF DESCRIPTION OF THE DRAWINGS

FIG. 1 is a block diagram of an exercise race communication system, including five exercise machines and a system control cabinet;

FIG. 2 is a detailed block diagram of a portion of the exercise equipment information, communication and display system of FIG. 1;

DETAILED DESCRIPTION OF THE INVENTION

As shown in FIG. 1, the preferred embodiment of the invention includes a system cabinet 30 and a group of five exercise machines 31-35. The system cabinet 30 is connected to the exercise machines 31-35 by an interface cable 36.

Figure 17:
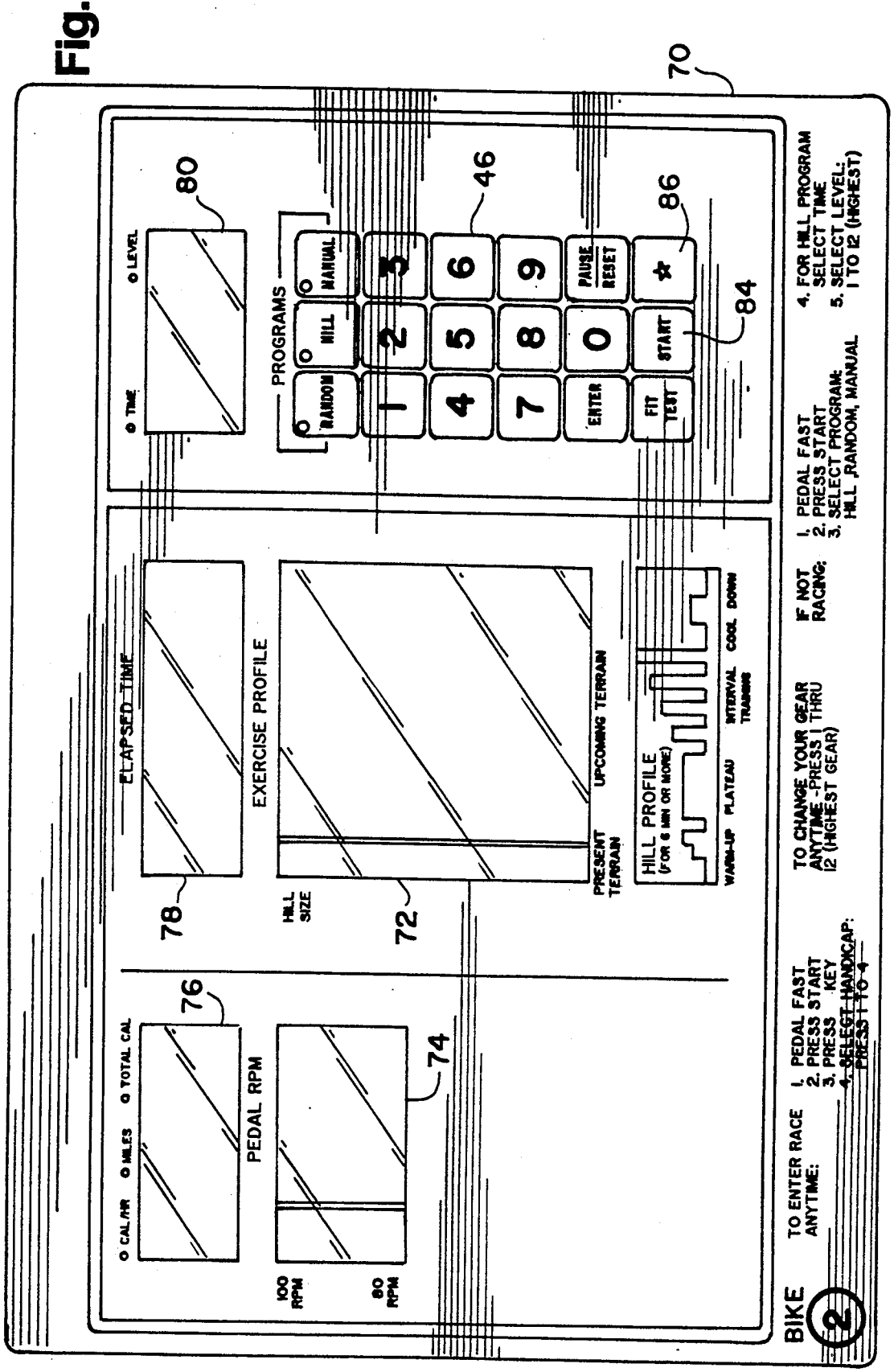
FIG. 17 is a plan view of a numeric and LED graphic display and input keypad utilized on the exercise machines of FIGS. 1 and 2.

As shown in FIG. 2, the system cabinet 30 houses a central controller or computer 38 and a video monitor 40. The central controller 38 is coupled to the exercise machines 31-35 by a network interface comprising a serial communication controller 42 and the interface cable 36. In this embodiment, the exercise machines 31-35 are stationary exercise bicycles, preferably the Lifecycle ® Model 9500 aerobic trainer sold by Life Fitness, Inc. FIG. 2 is a block diagram of the control circuits of Bike 1, which is typical of all the bikes. As shown in FIG. 2, each bike has a display 44 and a keypad 46, the details of which are shown in FIG. 17. An alternator 48, which is driven by the pedaling cyclist, produces electric power for the bicycle's electronics, controls the resistance felt by the racer on the pedals, and provides pedal velocity (RPM) data for calculating speed in miles per hour and distance travelled in miles. A pair of microprocessors 50 and 52 control data input from the keypad 46 and output to the display 44. Another microprocessor 54 and the serial communication controller 42 provide data and control communication with the central computer 38. The microprocessor 52 also controls the alternator 48 which provides resistance to the user of the bike 31. The central controller 38 is preferably an AT-class computer operating at a speed of at least 10 MHz. The computer 38 includes a memory, in this embodiment, both a random access memory (RAM) and a hard disc drive. The memory stores the program which generates graphics, controls the system and simulates a race.

Figure 3:
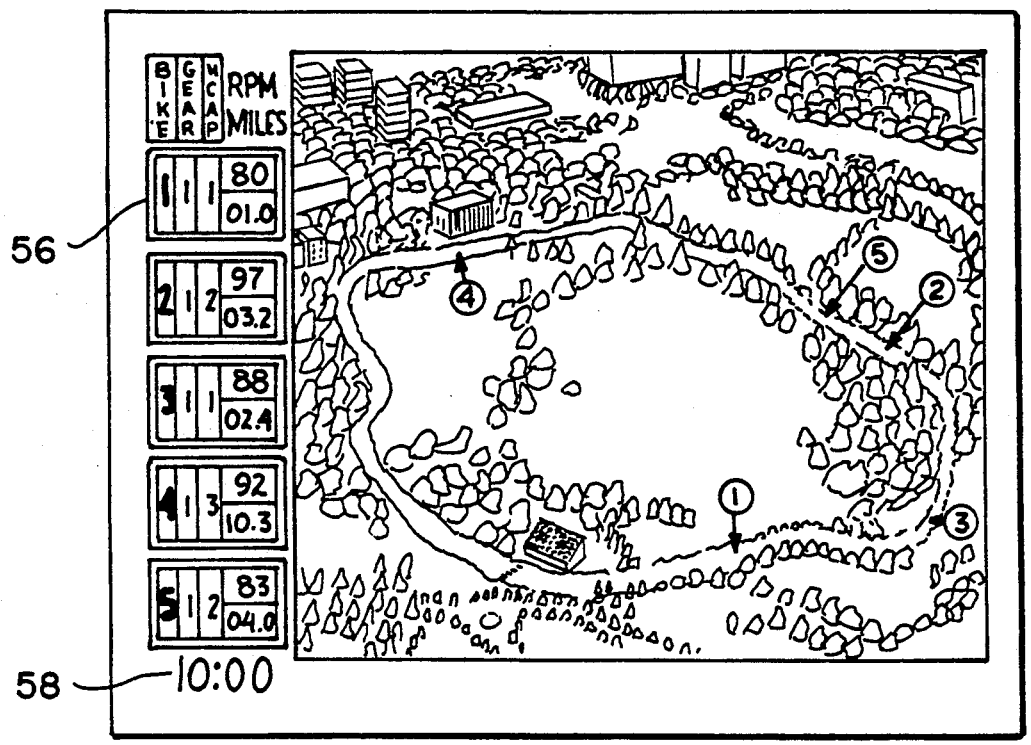
FIG. 3 is a view of the graphic display of an overhead profile of a race course, showing the actual position of the participants on the race course.

FIG. 3 is a view of the monitor 40 screen which provides a graphic display of an overview of a race course. The position of each racer is indicated by a different color and a number, corresponding to those shown on the bikes 31-35, and by a scoreboard 56 for each racer. The scoreboard portion 56 of the display shows each bike's number, gear, speed in miles per hour and distance travelled. It also shows the elapsed time 58 since the start of the race.

Figure 4:
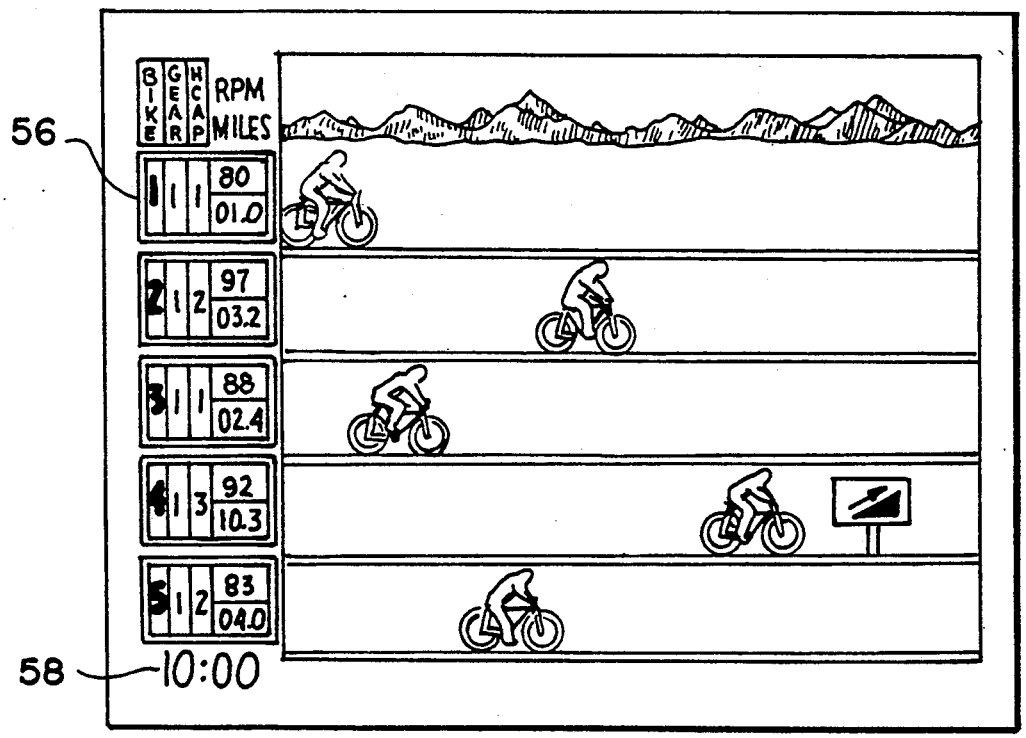
FIG. 4 is a view of a graphic display of a closeup side view of the race, showing the relative position of the participants to one another.

FIG. 4 is a view of the monitor 40 screen displaying a side view of the race, which indicates the relative position of the racers with animated bicycles 60. It also includes the scoreboard information displayed on the scoreboard portion 56 of FIG. 3. Under program control, the display preferably alternates between FIG. 3 for 15 seconds and FIG. 4 for 20 seconds. This allows the racers to keep track of both where they are physically on the racecourse and where they are with respect to their opponents. The logic for generating the graphics of FIGS. 3 and 4 is described in further detail in connection with FIGS. 7-16.

Figure 5:
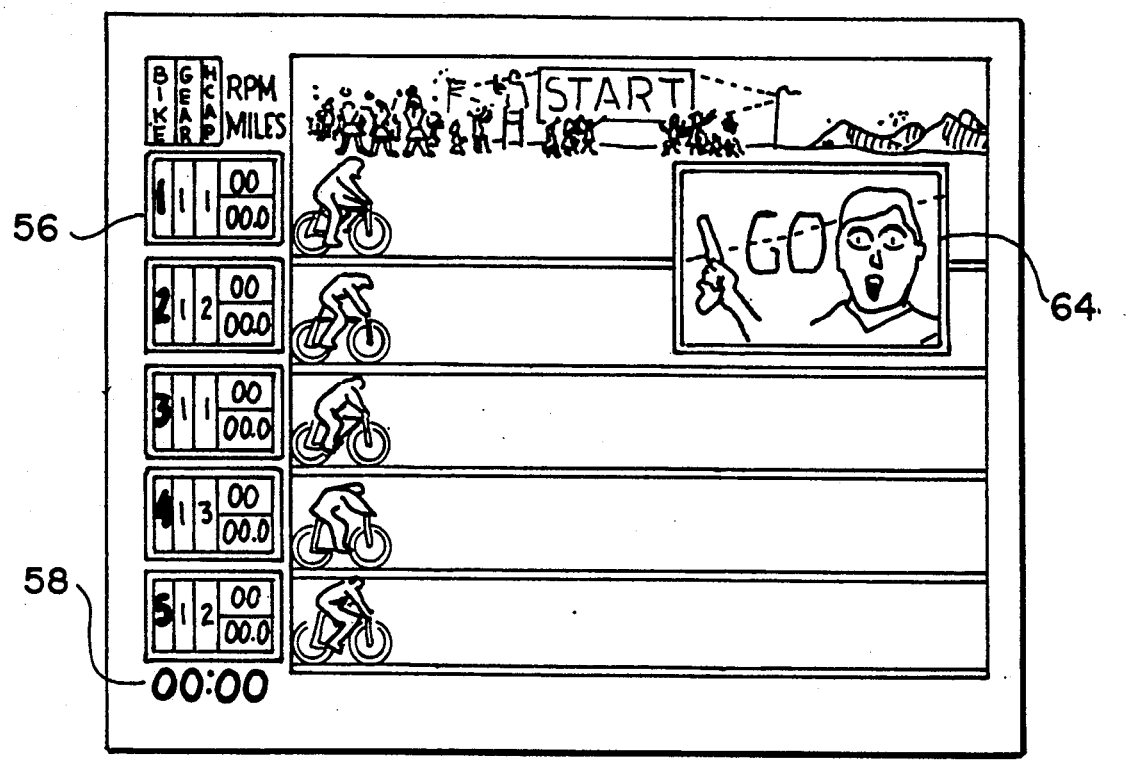
FIG. 5 is a view of the graphics for the start of a race.

FIG. 5 shows a screen generated on the monitor 40 at the start of a race, which features a crowd at the starting line and a starter 64 who fires a pistol to signal the start of the race.

Figure 6:
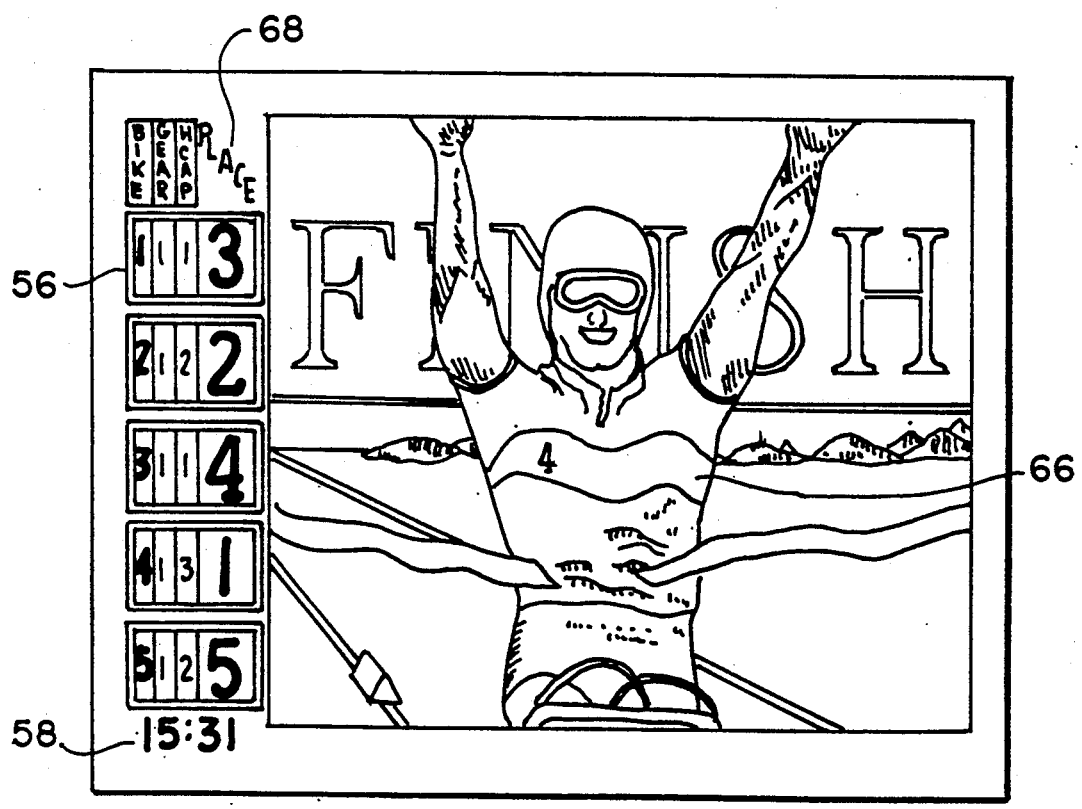
FIG. 6 is a view of the graphics for the finish of a race.
Figure 7A:
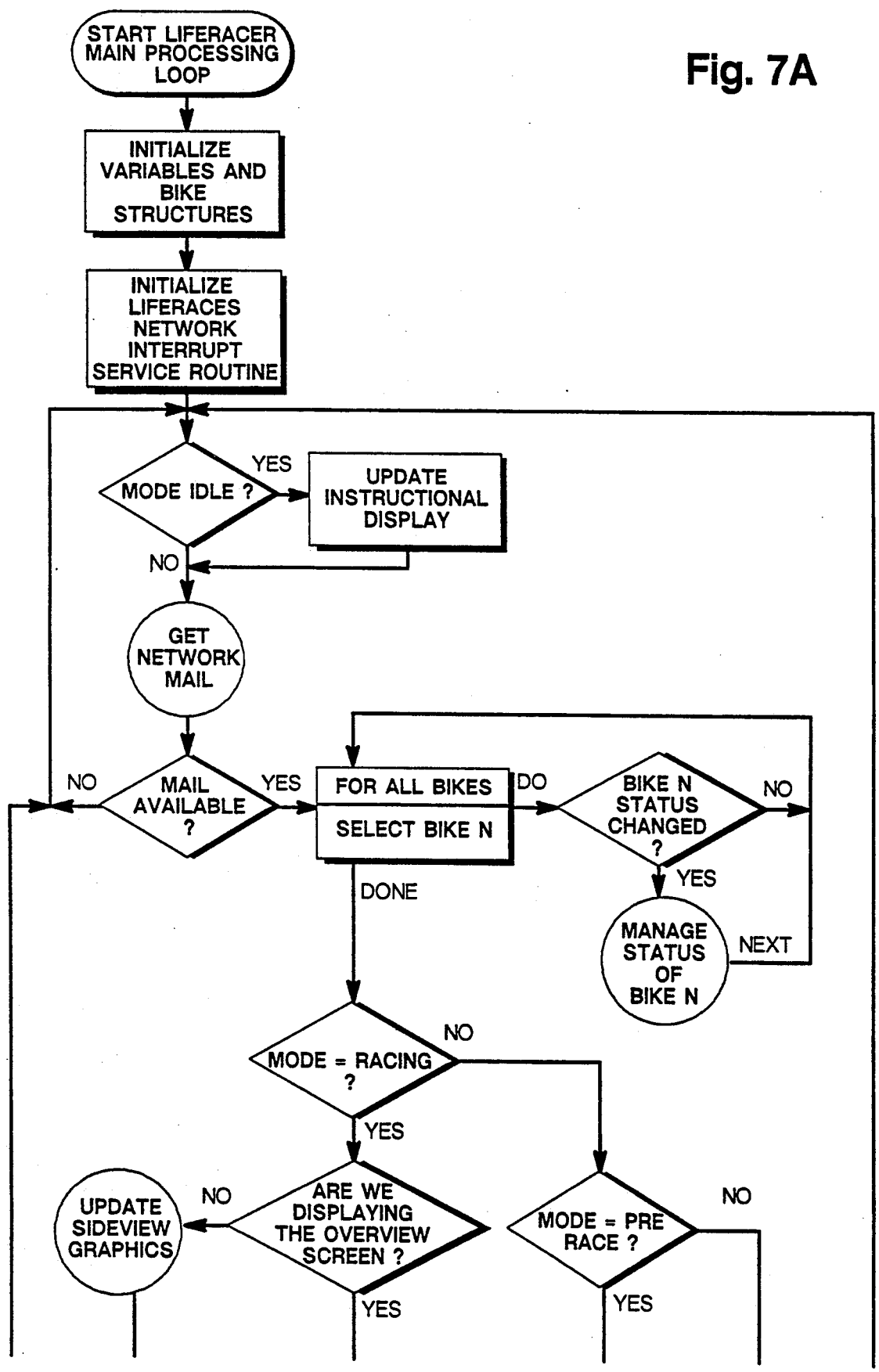
FIGS. 7-16 are logic flowcharts illustrating the operation of the system of FIG. 2.
Figure 7B:
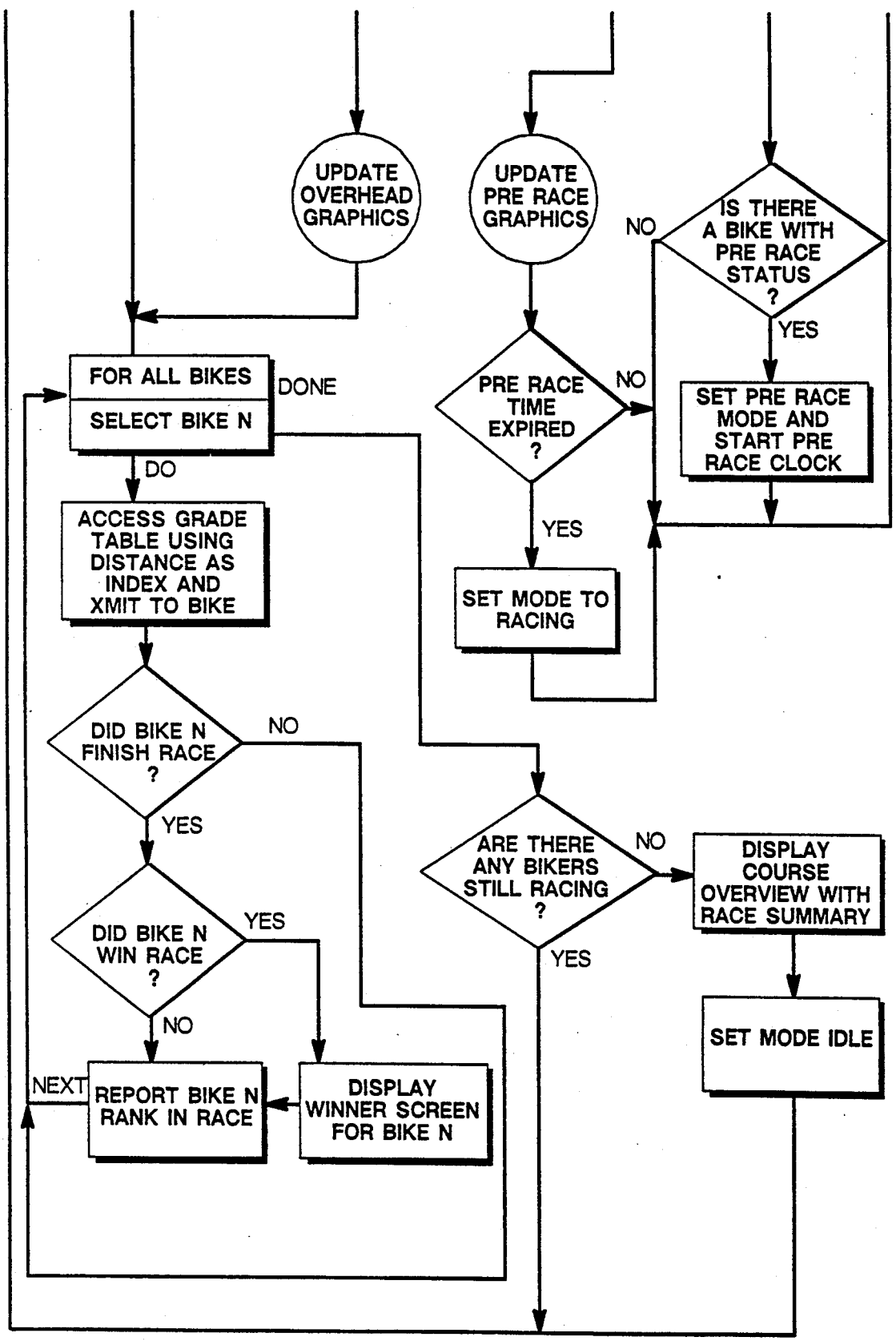

FIG. 6 is a screen display generated at the finish of the race, and is displayed on the monitor 40 when the first racer reaches the finish line, i.e., completes the selected distance of the race. An image of a biker 66 breaking the finish line tape is displayed, with the winning bike's number shown on the biker's 66 jersey. The scoreboard now indicates the order of finish with place numbers 68. After 10 seconds, the display returns to the views of FIGS. 3 and 4 until all racers have completed the course.

Each bicycle 31-35 has a control and display console 70 as shown in FIG. 17. This console includes a keypad 46 for data entry, an LED matrix display 72 for showing terrain (hill profiles), and digital numeric displays 74-80 for data including pedal RPM 74, calorie consumption and mileage 76, elapsed time for the bike 78, and input data 80.

Each of the bikes has both a physical identification and logical identification associated with it. Each bike's console 70 indicates the physical ID 82 as a number from 1 to 5. These same numbers appear on the monitor 40 screens as lane markers and position indicators and allow the rider to distinguish himself from the other bikes in the race. The logical ID is used by the computer 38 to identify message frames received over the communication network 36. The logical ID's are selected by jumpers or switches (not shown) associated with the network microcontroller 54 on each bike. By using a table in the computer's 38 memory, the computer 38 can determine the relationship between the physical and logical IDs and thus can associate the data it receives with the correct bike. The main reason for using the two different ID's is that it is more convenient for the computer 38 to perform the race logic with bikes having a beginning number of zero, while most people prefer to think in terms of numbers starting from one.

The operation of the system of FIG. 1 can best be understood by first considering the manner in which a race is conducted. When no bikes are engaged in a race, the monitor 40 displays an informational screen (not shown) which invites passersby to start a race. If a person desires to initiate a competition, he selects any one of the bikes 31-35 and begins pedalling. A prompt on the monitor 40 will tell him to press the start key 84 and asterisk key 86 on the keypad 46 shown in FIG. 17 if he wishes to initiate a race. The monitor will then display instructions to the initiator to select the desired length of the race (2, 4, 6 or 8 miles) by entering the desired number via the keypad 46. The monitor 40 will then ask him to enter his handicap (1=beginner, 2=intermediate, 3=advanced or 4=olympic) in the same manner. The handicap feature allows individuals of different fitness levels to compete against one another. The selected handicap number is used by the computer 38 to create a velocity multiplier ranging from 0 to 15%. The handicap provides a greater pedal resistance generated by the alternator 48 to the more advanced racer for the same pedal RPM, terrain and gear.

The monitor 40 then instructs anyone else desiring to enter the race on another bike to press the start key 84 followed by the asterisk key 86 and then to enter his handicap. The monitor 40 then displays a 3-minute countdown until the competition begins. During this time, participants can recruit additional participants by having them select an open bike and follow the login procedure using the start and asterisk keys. For convenient reference, the instructions for starting and entering a race are printed on the bike console 70. The monitor 40 displays the side view (FIG. 4) of the bikes queuing up for the race along with their selected handicaps. Each bike is assigned a lane number on the monitor 40 corresponding to the physical ID number 82 shown on each bike's console 70. The monitor 40 will switch to an overhead view (FIG. 3) at 20 seconds before the start, and then back to the side view at 10 seconds before start with the animated starter 62 (FIG. 5). At this point, no new riders are permitted to enter the race.

The competition is one lap over the prescribed course shown in FIG. 3 in the traditional counter-clockwise direction. During the race, the monitor 40 will switch between the overhead view (FIG. 3) and the side view (FIG. 4). The overhead view (FIG. 3) shows the position of all participants with a bike number. The side view (FIG. 4), which is the primary screen, features animated bikes 60 where the displayed pedalling rate corresponds to the actual pedal RPM of the participants and shows motion relative to a background scene. The animated bikes 60 start at the left side of the screen and move to the right, with the lead bike eventually being at the far right of the screen. All bikes are shown in the side view regardless of how far the last bike in the race is behind the lead bike (even for those which would technically be off the screen from a true distance perspective).

A programmed hill profile is employed to simulate the race course terrain. The hill size depicted in the terrain of the overhead course view of FIG. 3 is also depicted on an LED matrix 72 on the bike console 70 of FIG. 17. A rider is notified of an upcoming hill by a sign 62 in his lane on the monitor display of FIG. 4. The sign 62 moves closer to the bike 60 on the display, with the relative distance between bike 60 and sign 62 representing the distance to the hill. There are two distinct signs: Hill Approaching and Hill Peaked. These are represented by the direction of the slope shown on the sign 62. The grade of the hill, or level of difficulty, is displayed in the LED matrix 72 on the bike console 70. When a hill sign 62 appears on the monitor 40, a corresponding column of LED's is lighted and scrolls in on the LED matrix 72.

These visual representations of approaching hills serve to prompt racers to shift gears before a change in the hill profile. The racer selects a gear from 1 to 12 by pressing the appropriate keys on the keypad 46. It should be noted that this selection of values of 1 to 12 on the keypad 46 serves to define the basic exercise resistance level when the bike is being used apart from the race program. The speed of an individual bike depends upon 4 variables: pedal RPM, gear, hill profile, and handicap. The torque resistance of a bike depends on pedal velocity, gear selected and hill grade.

All the monitor screens of FIGS. 3-6 also display a table 56 with the following data: bike number, speed in miles per hour, distance travelled in miles, gear, handicap and elapsed time 58 since the race began. The bikes 31-35 also display on their consoles 70 of FIG. 17 the elapsed time 78 since they have entered into the race. If a bike began racing when the race started, these times are the same. If, however, the bike joined a race already in progress, the elapsed time 78 displayed on his bike console 70 is his personal elapsed time, which will be less than the race elapsed time 58 shown on the monitor 40.

When the first participant completes the selected distance, the race ends with a close-up front view of the lead bike breaking the tape at the finish line (FIG. 6). The number of the winning bike is shown on the graphic image of the winning biker 66, and the biker's jersey color matches the winner's color. The monitor 40 then switches back to the overhead view of FIG. 3 to show the ending position of each bike relative to the leader and the finish line. The place numbers 68 are displayed in the table area 56 of the screen.

As each bike crosses the finish line it is ranked in the order of finish. Once a bike finishes, and assuming others are still racing, that bike may log back into the race. The re-entering bike will start back at the starting line and is required to complete the full course to finish, at which point it will be assigned the next place number in sequence.

The technical details and logic for generating the graphics and controlling a race are illustrated in the logic flowcharts of FIGS. 7 through 15.

Figure 18:
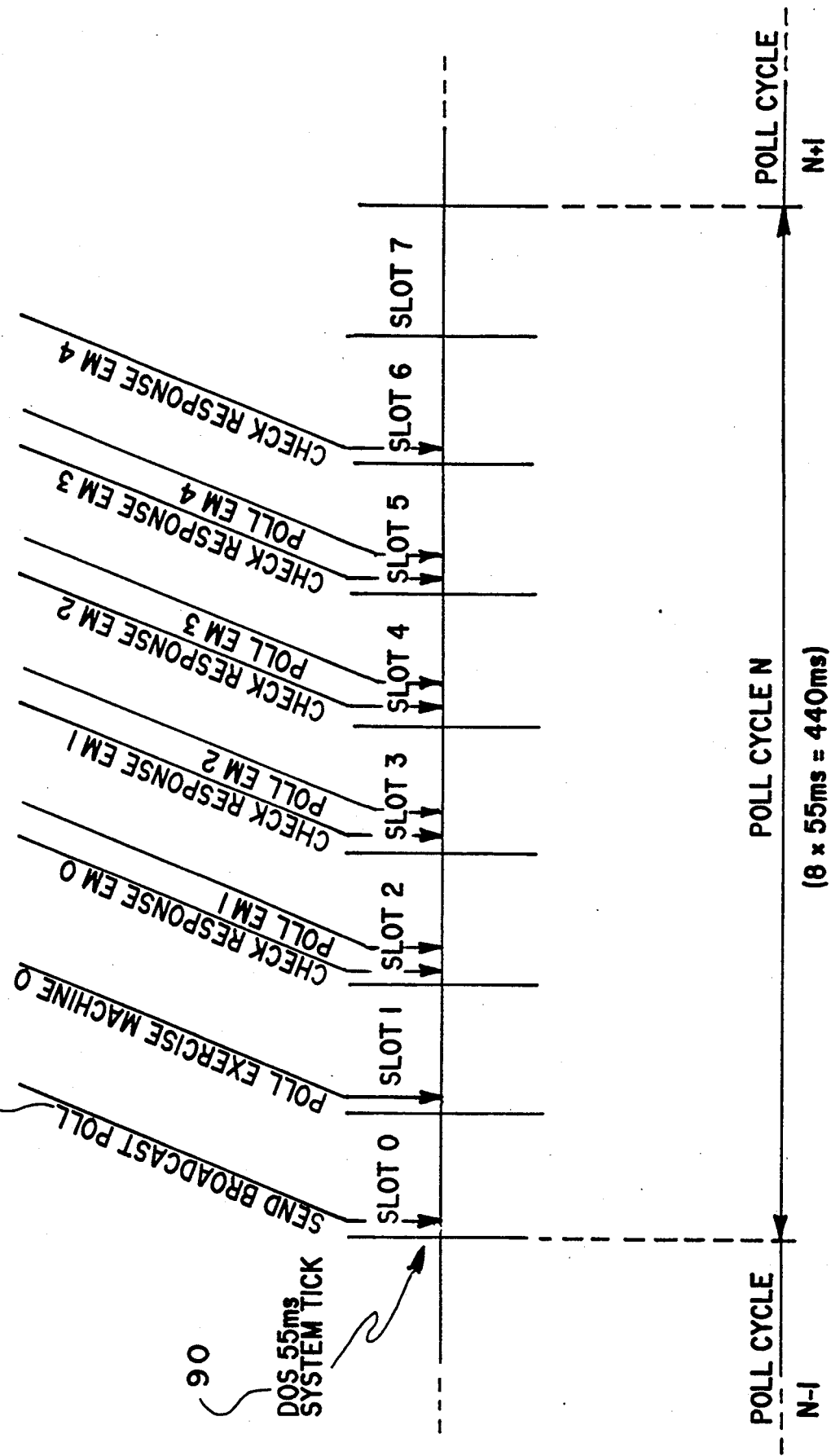
FIG. 18 is a timing diagram showing a polling cycle of the system of FIG. 2.

The computer 38, which handles the race logic, communicates with the bikes 31-35 by means of the communication network. Each bike 31-35 has its own microprocessor 54 to handle the network logic. In the preferred embodiment, the Appletalk network protocol is used to poll the bikes for updated data. The data which the race logic receives from each bike includes pedal velocity, gear, and handicap information. The computer 38 transmits to the bikes 31-35 data including load, hill, distance, calories/hour and total calories. A polling cycle, shown in FIG. 18, is established to collect data from the bikes 31-35. The cycle is divided into eight slots.

Figure 8A:
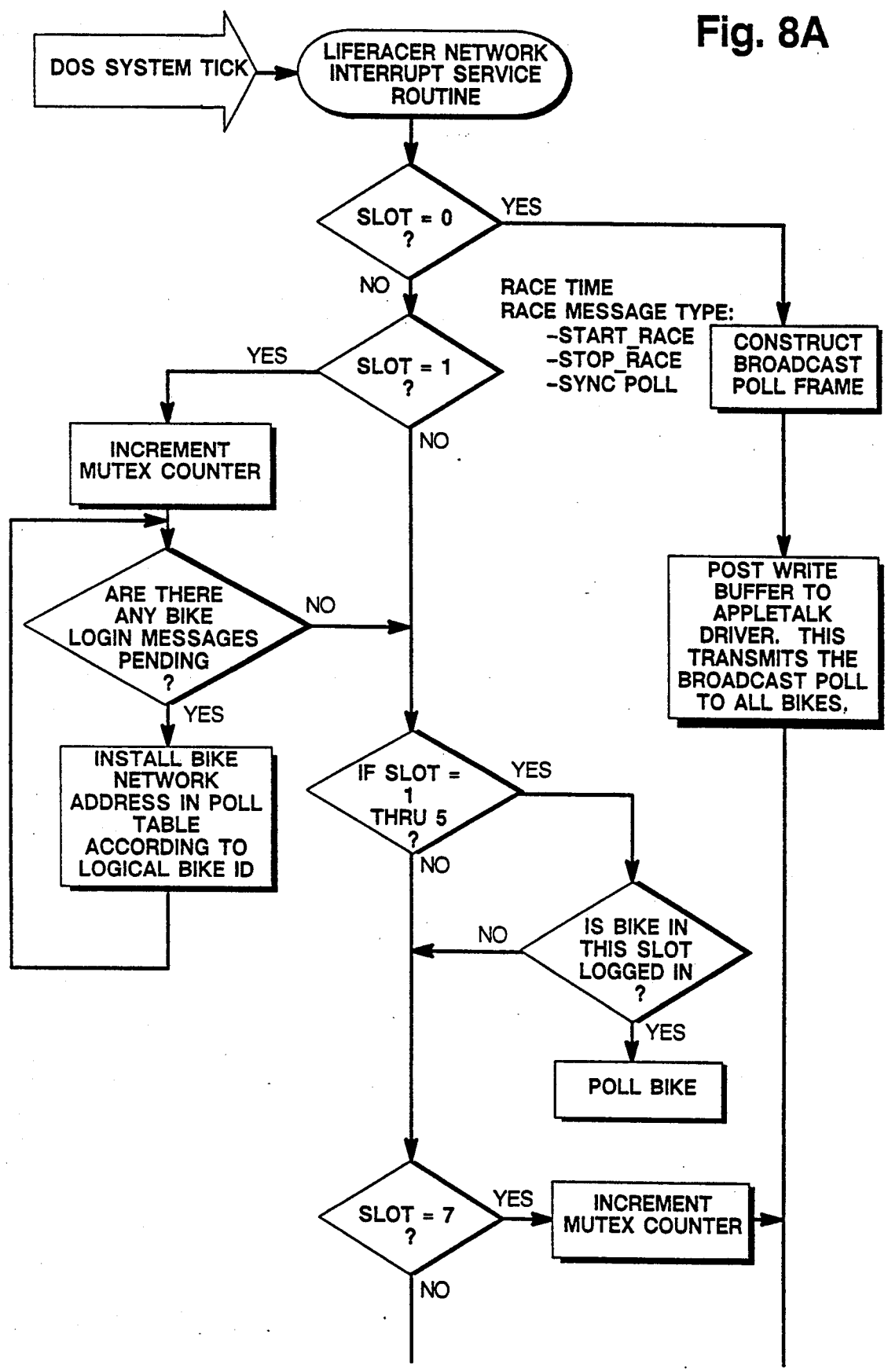
Figure 8B:
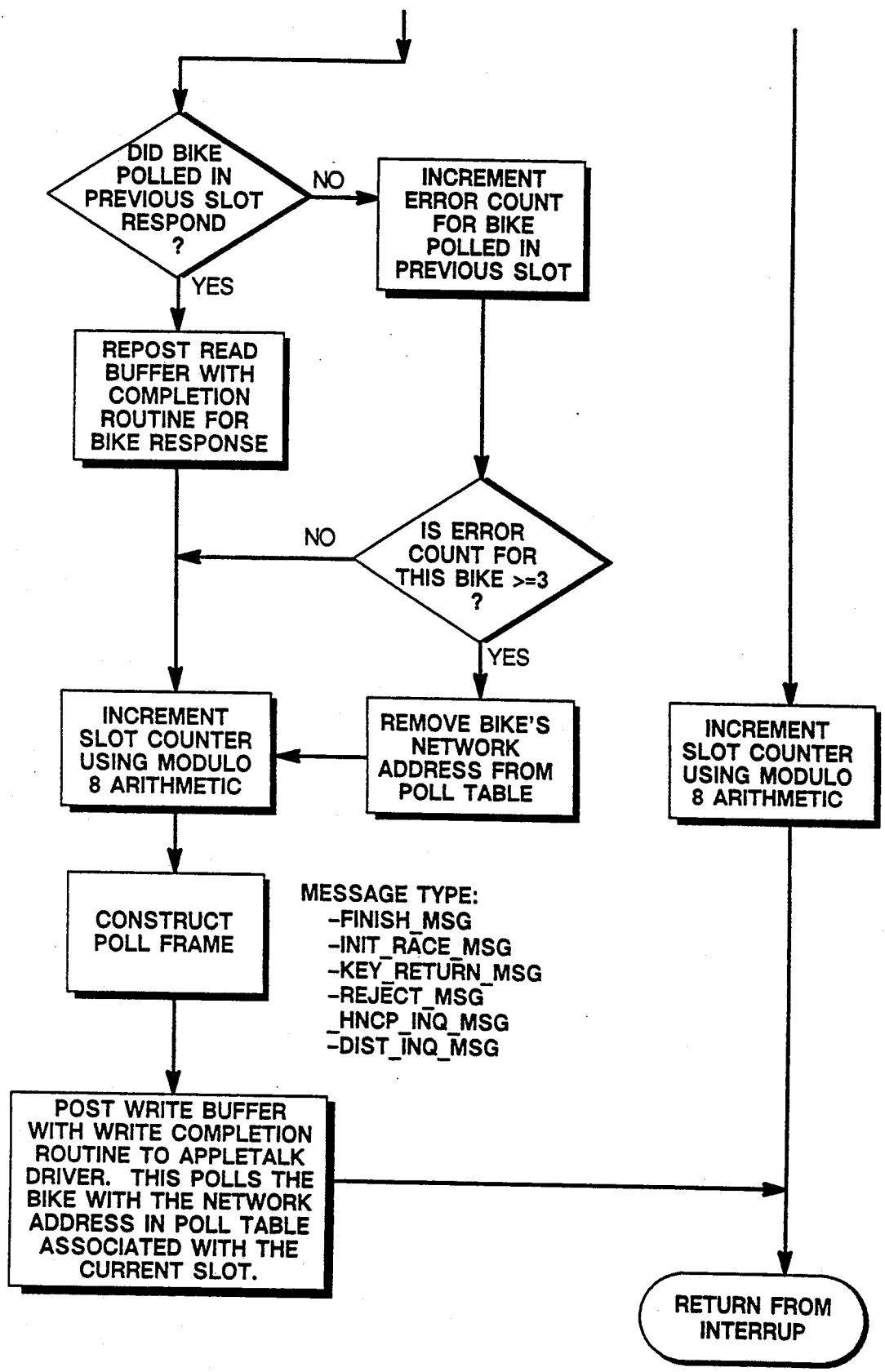
Figure 9A:
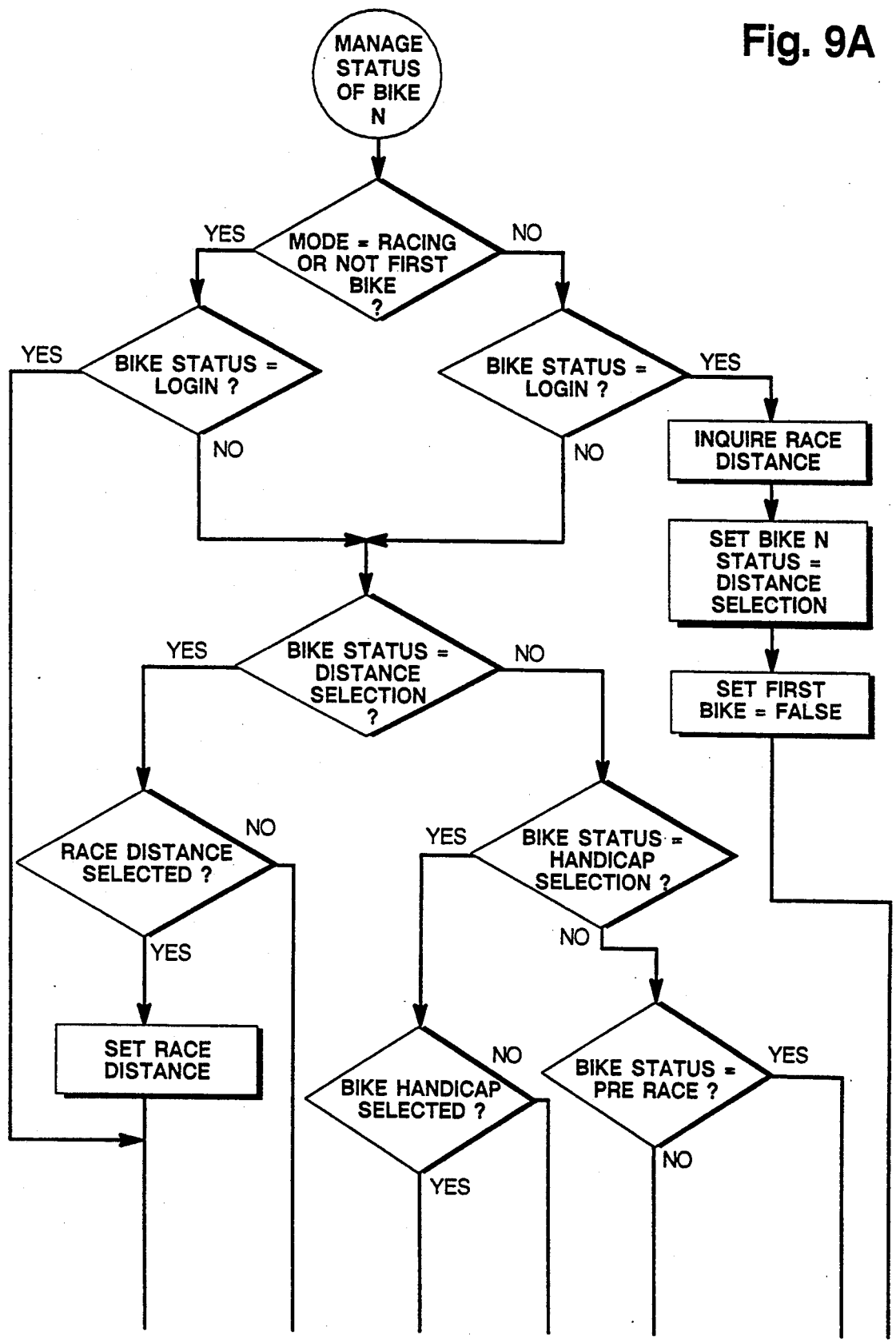
Figure 9B:
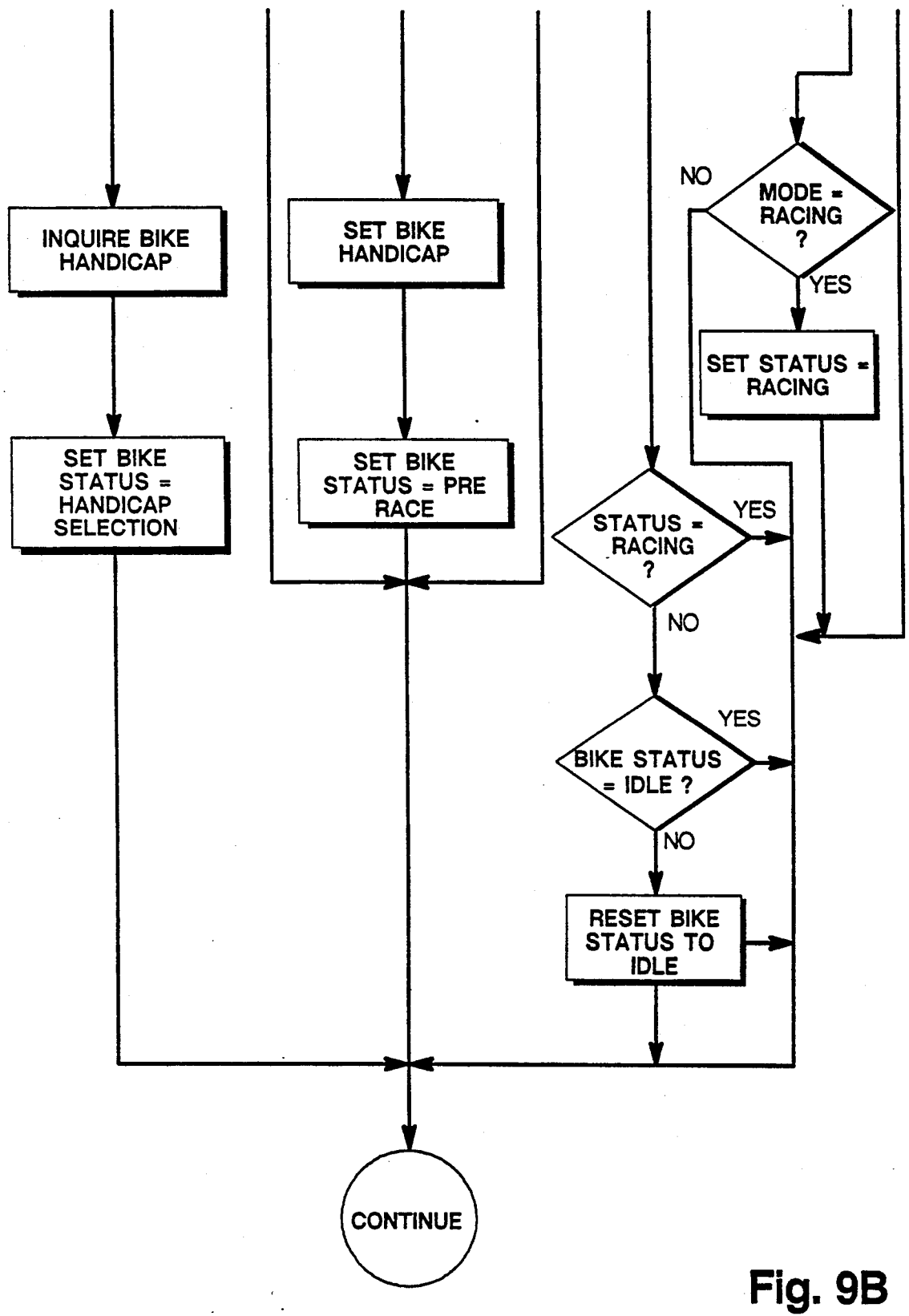

Management of the polling slots and data exchange between the network and race logic is handled by an interrupt service routine (ISR) illustrated in FIG. 8. As a matter of convenience, the ISR is activated by the disk operating system (DOS) system clock of the computer 38. In the preferred embodiment, this system clock generates a tick 90 18.2 times per second, or approximately every 55 milliseconds. Thus, each slot is 55 milliseconds long, and the poll cycle of 8 slots has a period of 440 milliseconds (8×55 ms) as shown in FIG. 18.

Data accumulated by the ISR and data to be written on behalf of the background task (race logic) is latched at the interface between the ISR and the background task. This ensures that the ISR and the background task do not access data simultaneously, which would result in potential corruption of the data. The ISR also checks to see that outbound data transmissions are performed without errors, or, if errors are detected, the appropriate recovery procedures are used. If an error is unrecoverable, an appropriate error message is reported (logged to a file) and the bike associated with the error is dropped from the race. The ISR also ensures that all data coming in from the bikes 31-35 is accumulated and therefore not in need of processing before the next one comes in.

The polling cycle of FIG. 18 starts with the broadcast poll 92 which is received by all of the bikes 31-35 that have been activated with the login sequence (using the start and asterisk keys). The broadcast poll 92 occurs in the first slot (Slot 0) of the polling cycle. The broadcast poll 92 signals the bikes 31-35 to lock down their data for the subsequent poll of the data. This procedure ensures that data is captured and interpreted in a manner guaranteeing a fair race. During each of the next six slot times the next bike will be polled and the receipt of a response from the previous bike checked. This continues until all bikes have been polled and their responses received.

A polled bike is given a maximum of 55 milliseconds including polling time to respond. If the bike does not respond by the time it is checked (in the next slot after its poll) this is noted. After 2 consecutive missed polls, the bike is considered to have dropped out of the race and as such is no longer polled.

The extra slots not used for polling or receiving bike data provide a guaranteed processing time for the background processor (race logic) to access the bike data.

A bike may be in one of two distinct states, namely racing or not racing. If a bike is not racing, its corresponding slot lies fallow and is available for use by the background task. A bike may transition from not racing to racing status by performing the login sequence. Upon login, the bike powers up its network processor 54. The network processor 54 turns off its line drivers so as not to interfere with valid data transmissions. The network processor 54 then selects a random network address according to the specifications and protocols of the particular network used in the system, with the exception of the one address reserved for the host computer 38. The bike's network processor 54 then attempts to acquire the communication channel via the serial communication controller 42.

Once the network processor 54 acquires the communication channel, it attempts to verify that the network address it randomly selected is not already in use. This is done by sending a message frame over the network interface cable 16 with a destination address equal to its own. If an answer comes back the processor 54 recognizes that another bike has that network address and it simply chooses another at random. This process is repeated until the processor 54 finds an address to which no other bike responds.

After the processor 54 initializes the network interface, it assembles a login frame and sends it to the computer 38. This login frame consists of a logical bike identification (BID) and the bike's network address. Upon receipt of the login frame, the host computer 38 places the bike's network address into a poll table in memory, indexed by the BID. All bikes with entries in the polling table will be polled during the next polling cycle.

Figure 10:
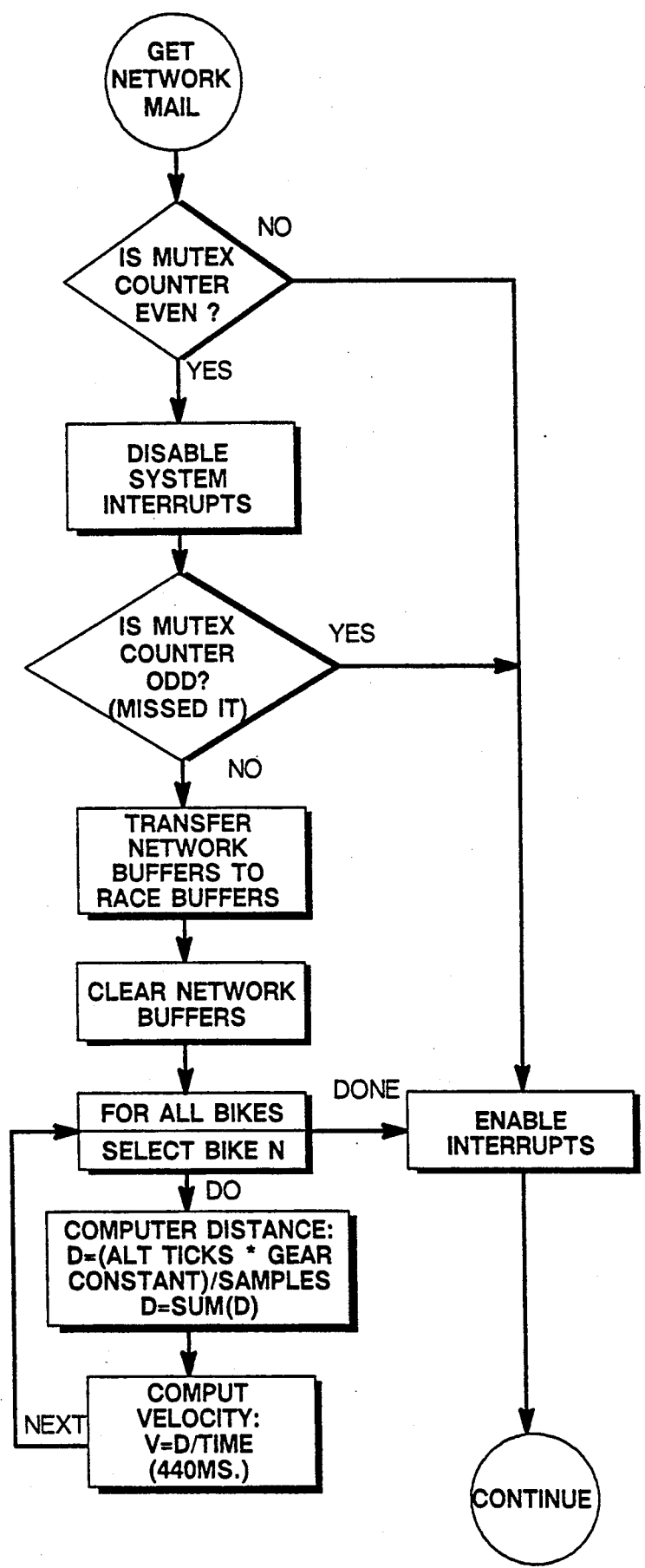

Access to the bike data is controlled by the MUTEX counter. As shown in FIG. 10, when the MUTEX counter is 0 or odd, the background task (i.e., the program running on the host computer 38) cannot access the network data structures of the bikes 31-35. When the MUTEX counter is even, the system interrupts are disabled and data from the network buffers of the bikes 31-35 can be accessed and transferred to the race buffers of the computer 38 for use by the background task. The MUTEX counter is active (odd) from the time that the ISR starts polling the bikes and becomes inactive (even) at the end of the response from the last bike. As seen in FIG. 8, the MUTEX counter, which is initialized to 0, is incremented to odd in slot 1, and incremented again to even in slot 7. Referring to FIG. 18, it will be seen that the MUTEX counter is active during those slots when bikes are being polled (1-6), and inactive during those slots when the background task may access bike data (slots 0 and 7). Note that since the broadcast poll 92 in slot 0 does not affect bike data, MUTEX may be inactive at that time.

Figure 12:
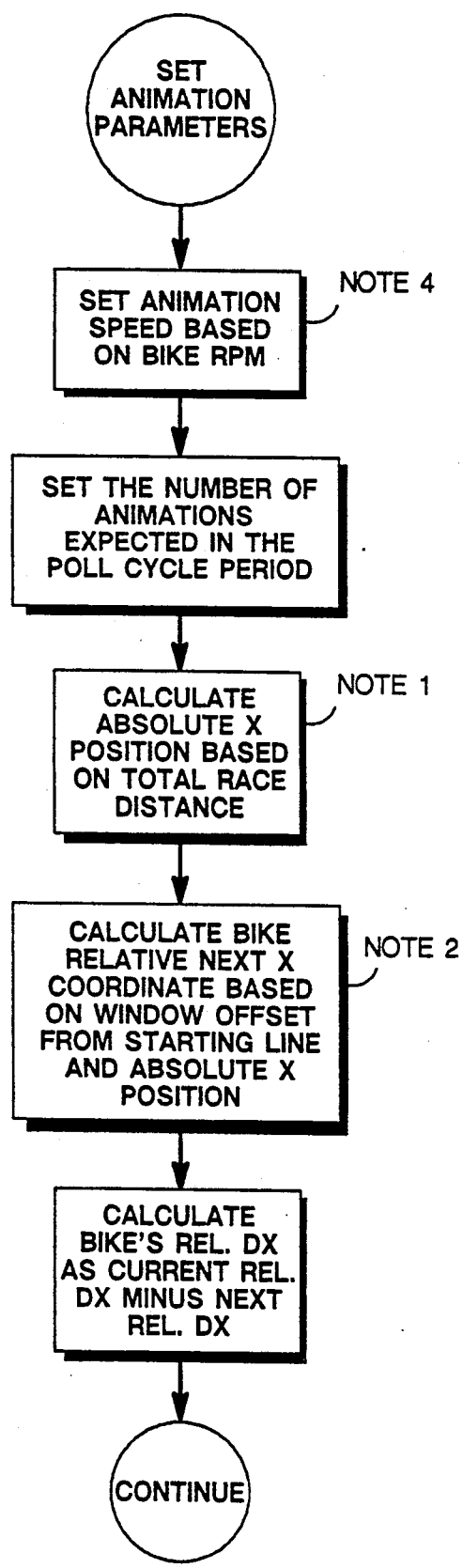
Figure 13A:
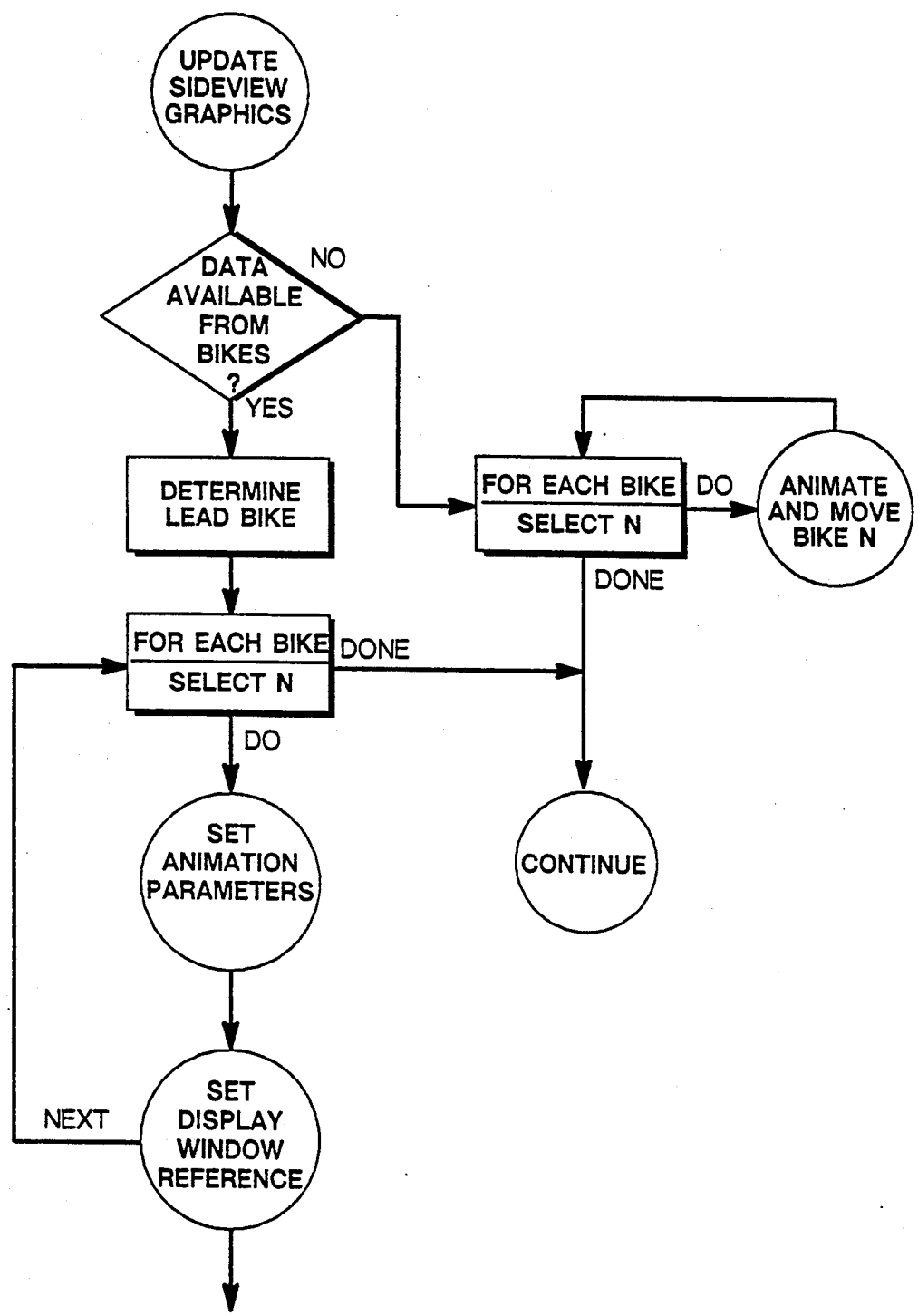
Figure 13B:
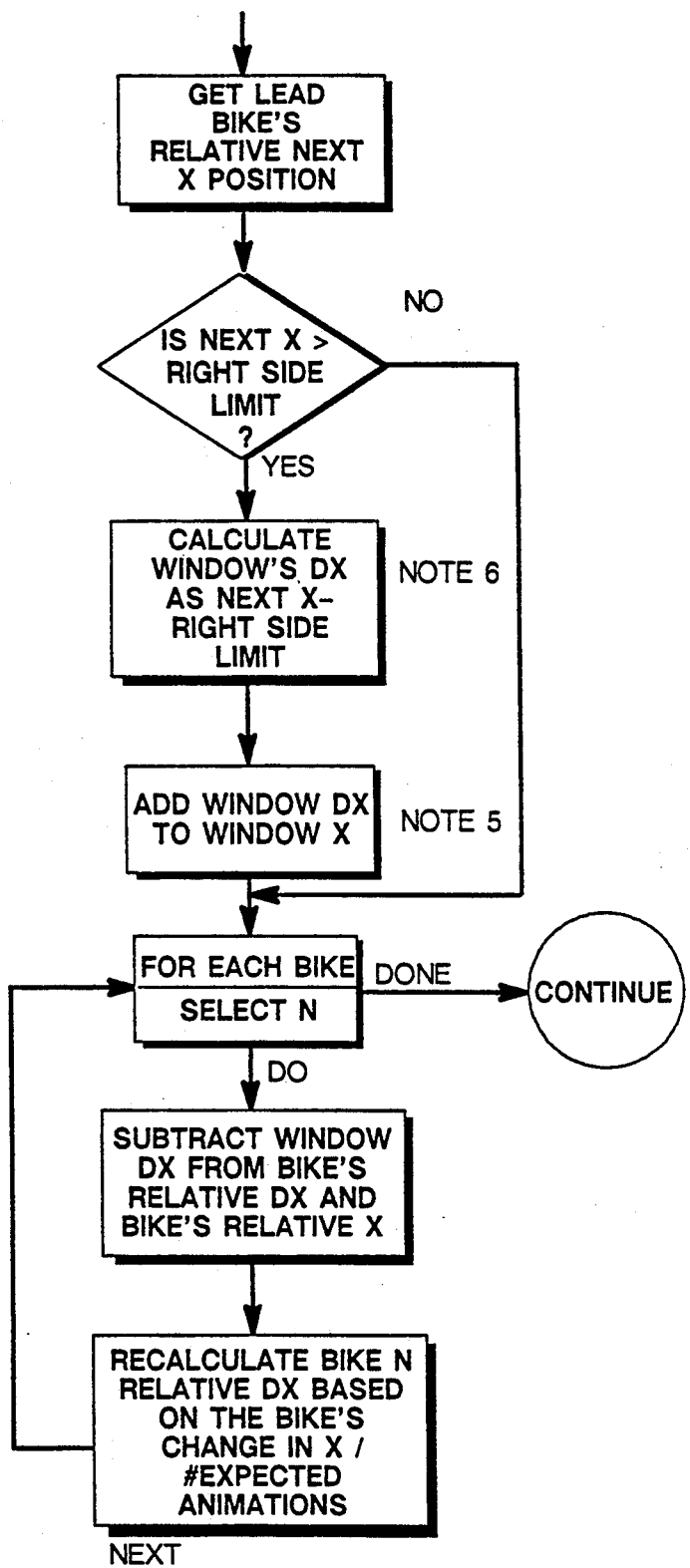
Figure 14A:
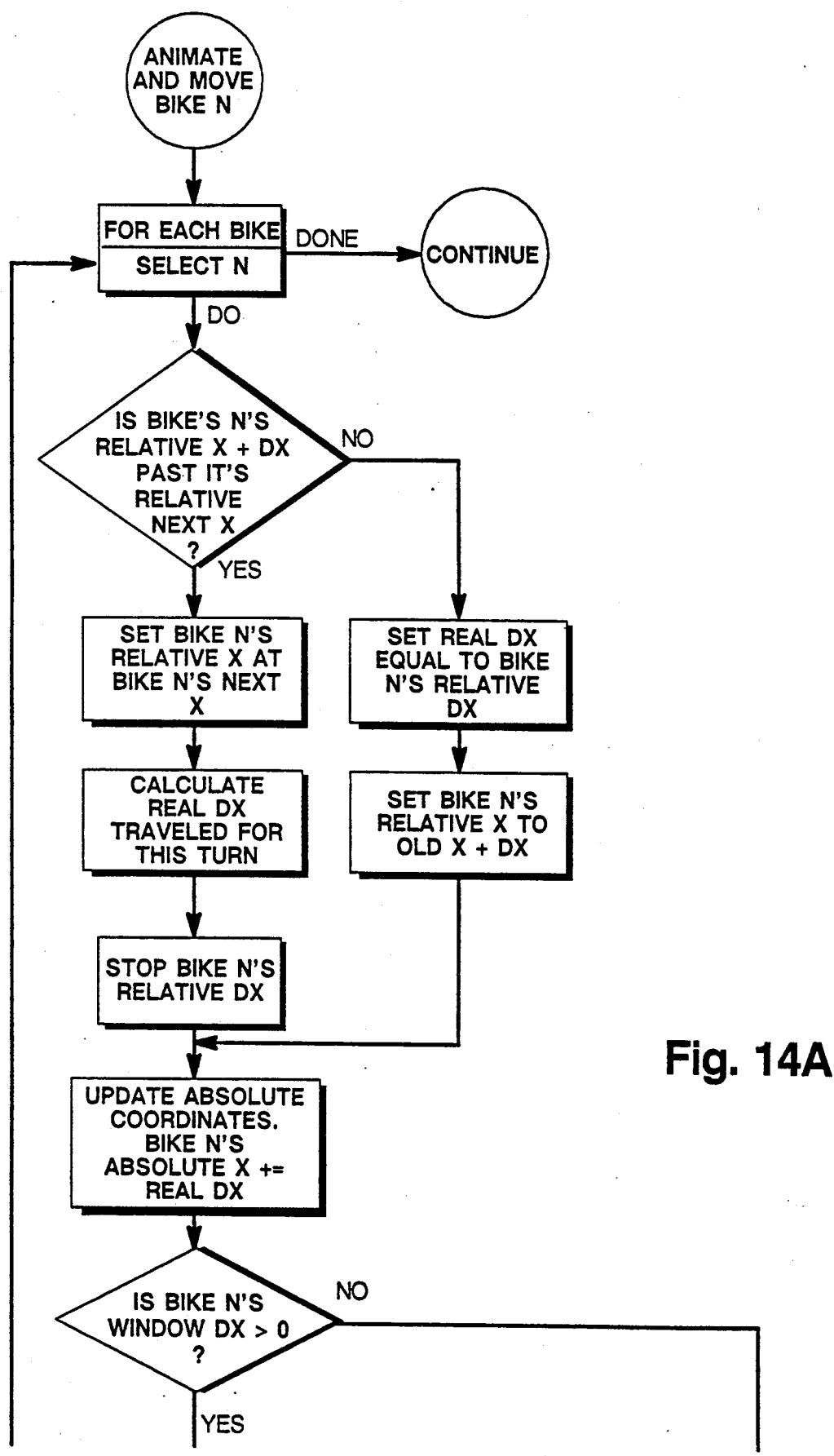
Figure 14B:
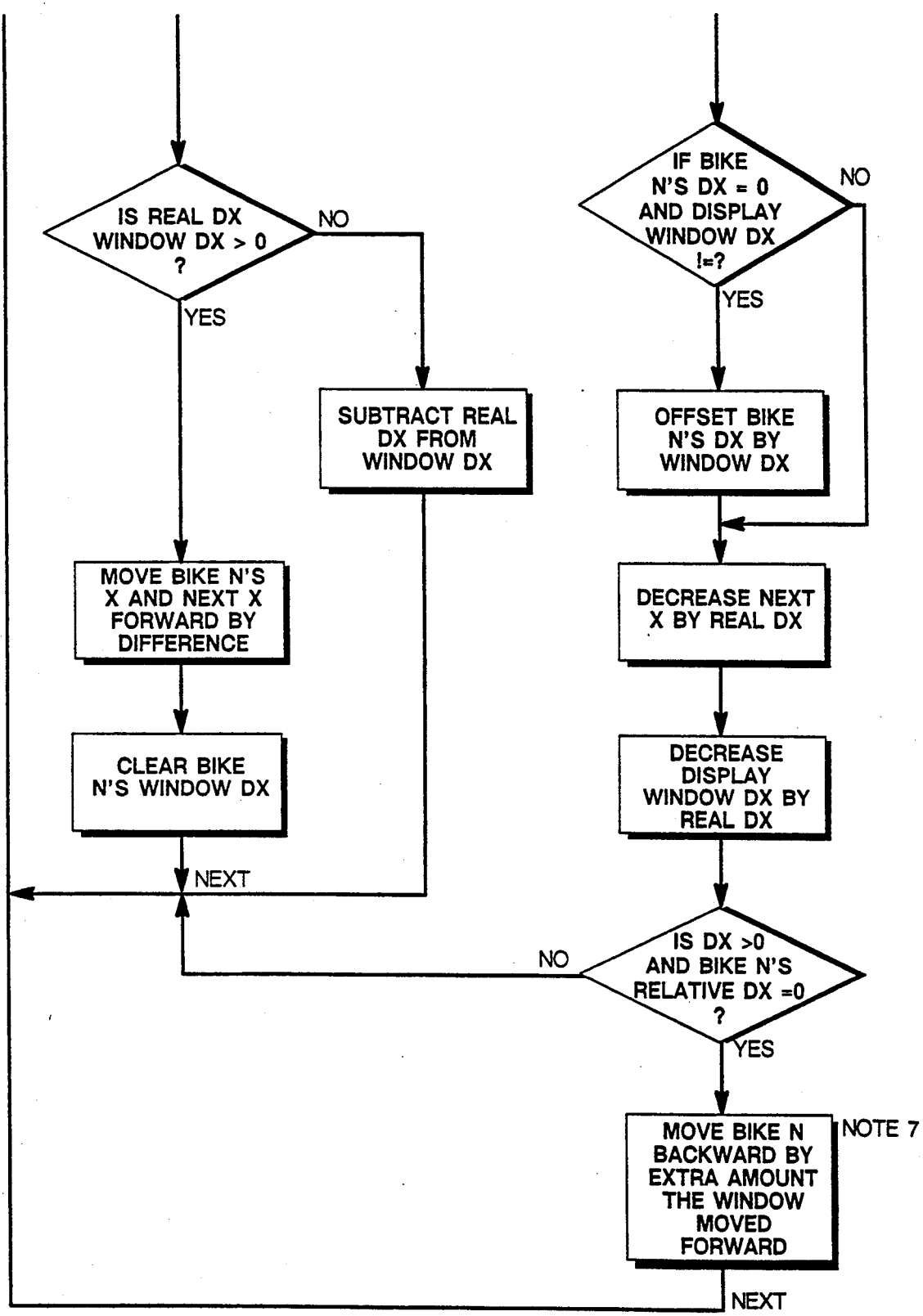
Figure 15:
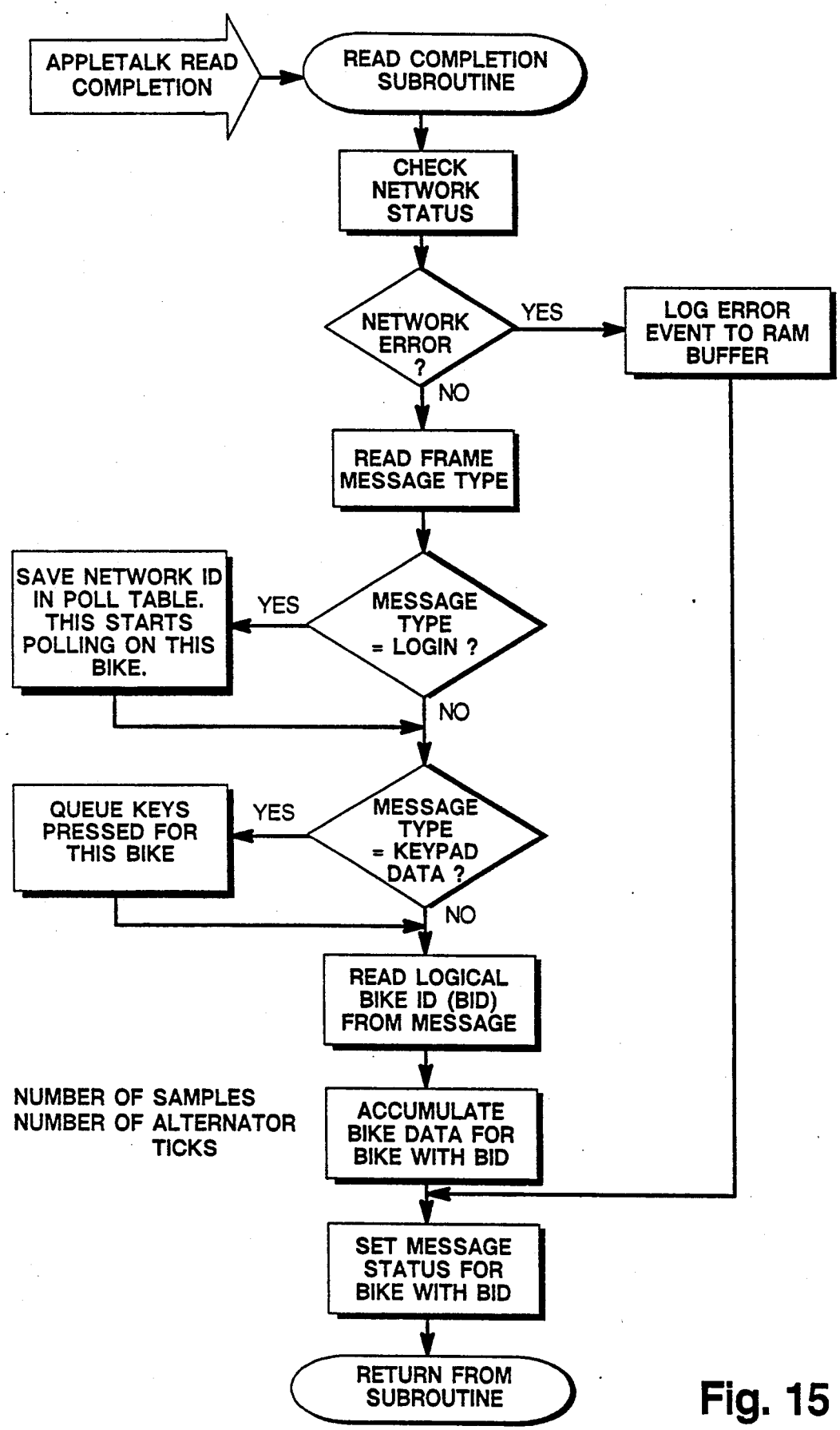
Figure 16:
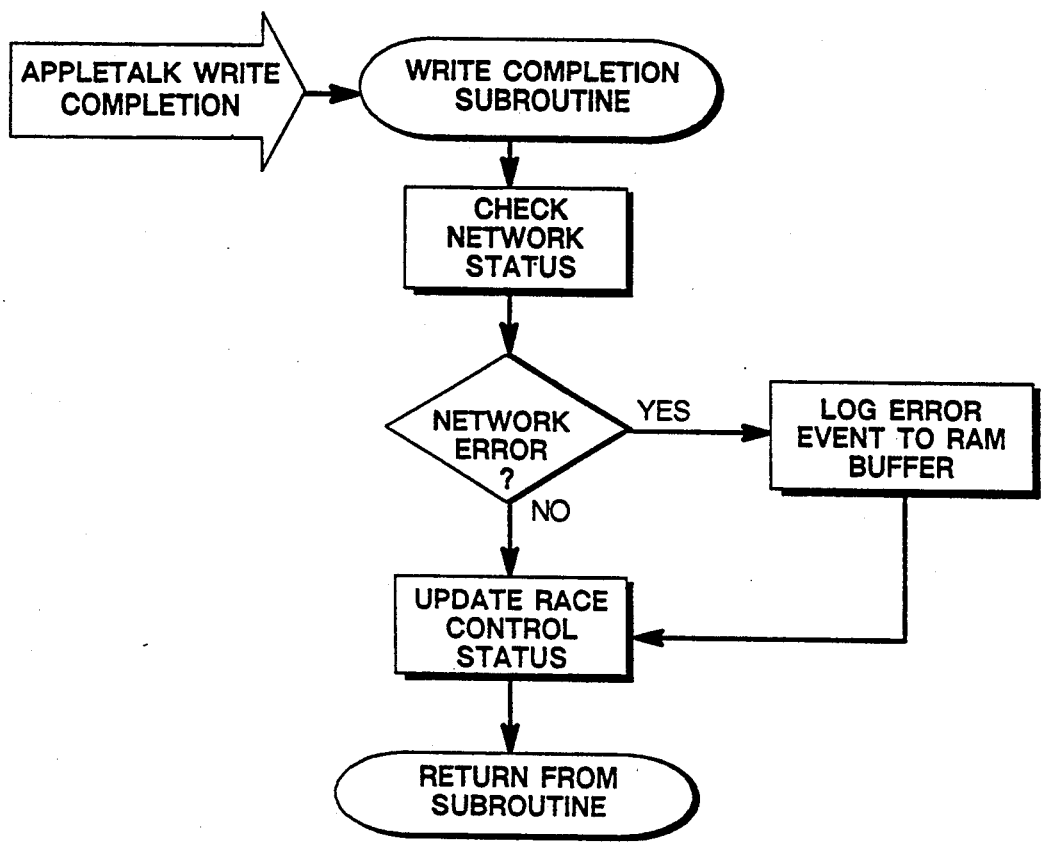

The bike motion and animation of FIG. 4 are under the control of the computer 38 using the logic illustrated in FIGS. 12-14. Each bike has two sets of Cartesian coordinates, absolute and relative. Because motion is always in an x-direction, the y-coordinates are always zero. The absolute x-coordinate is the number of pixels on the screen display of FIG. 4 that the bike has moved from absolute zero, the starting line, and thus is strictly tied to the distance that the bike has travelled. By calculating the distance a bike has travelled in miles and applying a known number of pixels per mile, the computer 38 can translate exactly how many pixels the bike has travelled from the start.

The relative coordinates are based on the lead bike's absolute x coordinate. Because the lead bike cannot move further to the right once it reaches the right hand side of the lane, FIG. 3, the logic utilizes a "window" that slides along at the same rate as the lead bike. Therefore, the lead bike, once it hits the right hand limit of the lane, stops moving "relatively" because the motion of the window exactly offsets that of the bike. Literally, the window's change in x is identical to the lead bike's change in x; they are moving at the same speed in the same direction. However, the lead bike continues to move "absolutely" with respect to the start. The window also moves absolutely at the same rate as the lead bike.

As the lead bike pushes against the window, the motion of the window is transferred to the other bikes in the race, which stops them from moving relatively as well. However, if a trailing bike is moving faster than the lead bike, the relative distance between the two bikes decreases. Conversely, for trailing bikes moving slower than the leader, the relative distance increases. In effect, if they are catching up to the leader, they will nudge closer and closer, but if they are losing ground they will drop back. In a literal sense, if a particular bike's dx for one polling period of 440 ms is larger than the leader's (i.e., the window's dx), then the bike will move closer by the difference in the bikes' dx's.

In order to minimize computer 38 processing time, it is desirable to move a bike 60 only each time it animates, thus using only one write cycle instead of two (i.e., one to move and one to animate). Also, the bike 60 must be moved frequently enough that its motion appears smooth. To avoid sudden jumps to a new position, the actual change in x is broken down into smaller steps that are taken once per animation. Based on the animation speed, the computer 38 calculates how many animation updates are needed in 440 ms, and then estimates an actual dx that the bike 60 moves each animation. The bike 60 travels its total change in x over its number of animations, and smoothly arrives where it should be.

For example, a rider pedaling at 80 RPMs will have 400 animations per minute (there are 5 patterns of animation per revolution). In 440 ms, the bike 60 would average 2.93 revolutions per 440 ms. The width of the lane screen is defined to be $\frac{1}{4}$ mile. The actual lane screen width is about 385 pixels, so each pixel represents 0.000623 miles. If the bike is in 12th gear, its speed is approximately 24 mph, and thus moves 4.7 pixels in 440 ms. For speed of computation, all arithmetic is integer rather than floating point, so 2.93 and 4.7 are rounded up or down, yielding 2 or 3 animations in which to smooth out 4 or 5 pixels worth of motion.

Because pixels are discrete, fractional values are avoided in the computations. Instead, the computer 38 establishes a "next x" based on the bike's absolute x coordinate. That is, the computer 38 calculates the exact next coordinate the bike should be at if the motion algorithm were perfect. The difference between the bike's next x and its current x is its change in x. This is divided by the number of animations and rounded up to ensure that the bike's actual dx gets it to or past its next x within 440 ms. When it is time to move a bike, its new x is calculated as its current x plus its actual dx. If its new x is at or past its next x, the bike 60 is stopped by clearing its actual dx and forcing its new x to be at its next x. The bike 60 stops moving until the next 440 ms cycle, which will be imminent.

This scheme is particularly useful when the computer 38 is very busy and does not have enough time to animate and/or move any or all the bikes 60 enough to get them to their next x in time. The bike's next x has been calculated, but the current absolute x is updated when the bike actually moves. By tying the actual absolute x coordinate to the relative motion, rather than how far it is estimated to have moved in the last 440 ms, the next change in x calculation automatically takes the delay into account. Thus, when the computer 38 is busy, no extra write operations are necessary to make the bike 60 catch up. Instead, the logic smooths out the distance the bike 60 needs to travel over the next 440 ms and continues to do so until the computer 38 catches up. In order for this scheme to be effective, the computer 38 must be capable of catching up with five bikes moving at a reasonable rate. The preferred AT class (80286) computer running at 10 MHz with a fast video adapter card works adequately.

The motion scheme just described is merged with the window scheme previously discussed. When a lead bike is pushing against the right hand side of the screen, the computer 38 calculates its relative next x coordinate as some number of pixels beyond the right side of the lane. The difference between the right side of the lane and the next dx is defined as the window dx. A copy of the window dx is reflected to the logical representation of each bike in the race, including the lead bike. (By not making the leader a special case, all five bikes have the same code sequence, i.e., the leader does not require different code to animate and move than the other four bikes.)

Each time a bike 60 animates, rather than adding its actual dx to its current relative x, the bike subtracts its actual dx from its local copy of the window dx and stays in the same place. The window has in effect been slid over by the amount of the actual dx. Since the bike 60 moved its actual dx closer to its next x, the bike's relative (i.e., window) next x is decreased by the actual dx, effectively sliding the next x closer to the bike.

If the bike reaches its relative next x, or the next x reaches the bike, and the local window dx has not been fully negated by the accumulation of actual dx's, then the lead bike pushed the window farther than the bike moved. To compensate for this loss in distance to the leader, the bike's relative current x (and its next x) are actually moved to the left (losing ground to the leader) by the amount of the excess window motion.

Conversely, if the bike's local window dx has gone to zero, and the bike still has not reached its next x, it is moved forward by the amount of the overshoot. During the first ¼ mile of the race, no bike is at the right hand side of the lane pushing the window, so the window dx is always zero. The bikes automatically move to the right when the window dx=0. Thus, no special case is required for the start of the race.

Figure 11:
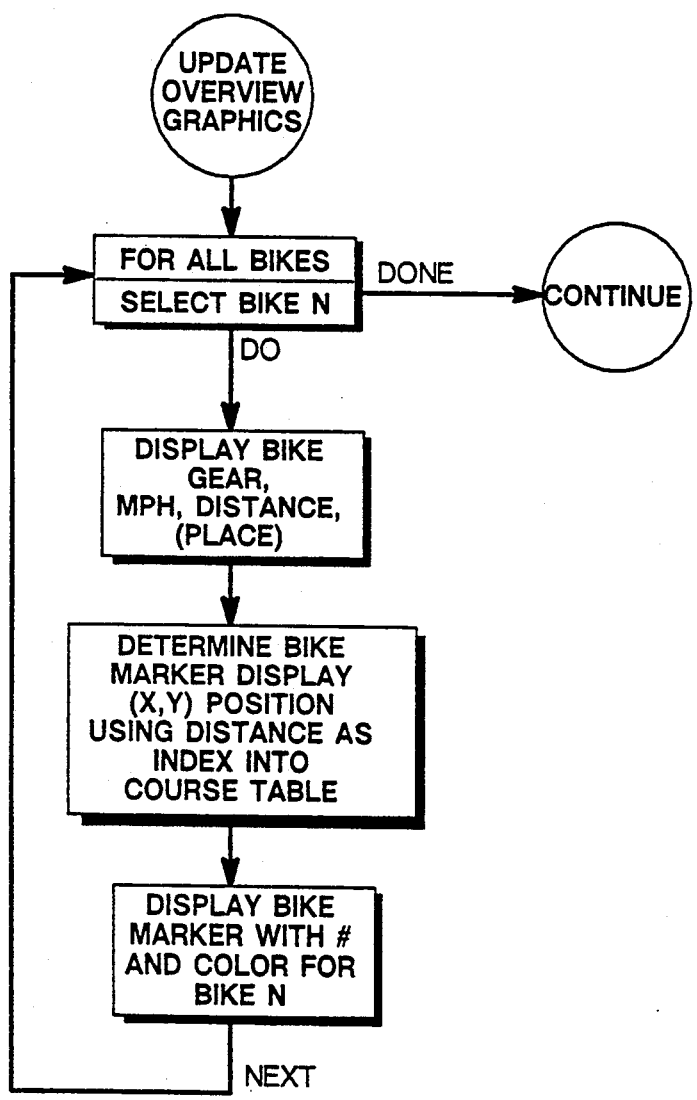

Other animated objects are treated in much the same fashion. For example, hill advisory signs 62 are in effect moved as bikes with zero velocity. In order to calculate the position of the racers on the overhead view of the course, FIG. 3, the computer 38 uses the actual distance travelled in miles to look up the bike's (x,y) coordinates in a table, as shown in FIG. 11. The values in the look-up table are predetermined for the racecourse and stored in the computer's 38 memory. A marker for the bike with the bike's color and number are displayed on the screen of FIG. 3 at the (x,y) location.

Figure 19:
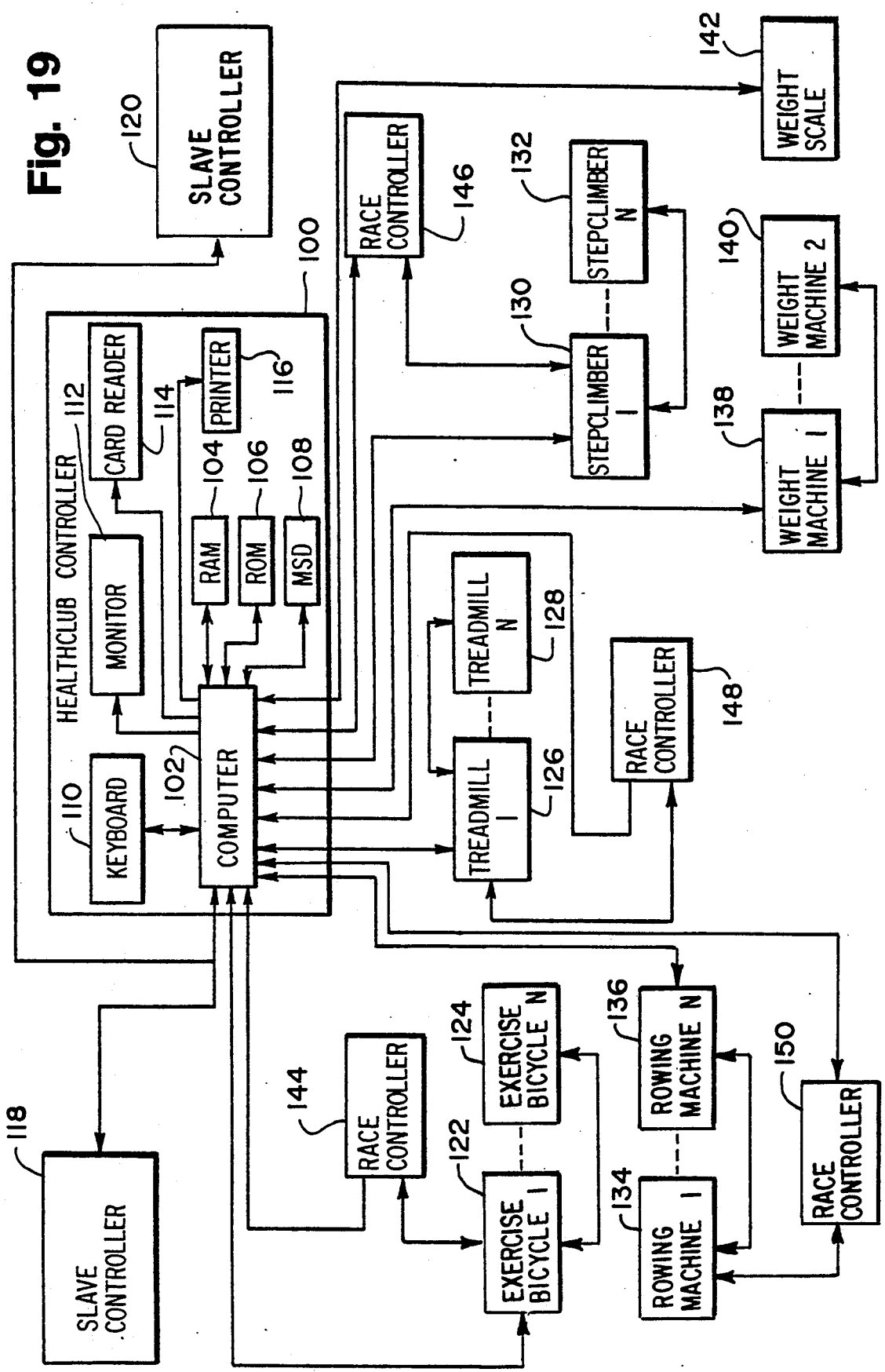
FIG. 19 is a block diagram of a health club control system for controlling various types of health club equipment including the race system of FIGS. 1-18.

FIG. 19 provides in block diagram form an illustration of a control system that can be used to control and obtain data from a variety of exercise and other equipment in a health club. Included in this system is a master health club controller 102 which features a computer 100, random access memory 104, a read only memory 106 and a mass data memory 108 such as a hard disk memory for storing large amounts of user data. Also included in the master controller 100 is an alphanumeric keyboard 110, a color monitor 112, a magnetic card reader 114 and a printer 116 which are operationally connected to the computer 102. In the event that the system of FIG. 19 is to be used in a large health club, one or more slave controllers indicated at 118 and 120 can be connected to the computer 102 and located in various places in the health club to make it convenient for the members to use the system. The slave controllers 118 and 120 preferably contain the same elements as the master controller 100 and operate under its control.

In FIG. 19 a representative example of various types of electronically-controlled exercise equipment including exercise bicycles 122 and 124, treadmills 126 and 128, stepclimbing equipment 130 and 132, rowing machines 134 and 136, weight machines 138 and 140 and a weight scale 142 are shown as connected to the computer 102 by data communication lines.

The system of FIG. 19 can provide a large number of features to enhance the operation of a health club. In the preferred embodiment, a member will first identify himself to the master controller 100 by, for example, typing his full name on the keyboard 110 and if necessary his birthday, social security number or other personal identification information. The computer can respond to this identification by accessing the member's data from the user data memory 108 which can include: a membership or club identification number; set up parameters for each type of the exercise equipment 122 ... 142; historical performance records for the member; and a recommended exercise protocol for that individual. Also the computer 102 will have the ability to, in effect, prevent the member from using the equipment if, for example, he has neglected to pay his club dues.

Next a menu can be displayed on the monitor 112 which will include various options for the member such as: use the exercise equipment 122 ... 142 in accordance with a predetermined exercise program stored in memory; review the predetermined exercise program; modify the predetermined exercise program; obtain a print-out from the printer 116 of the predetermined exercise program; review his historical exercise data stored in the memory 108; or obtain a print-out of this historical data.

In the event that the member desires to perform the predetermined exercise program on a particular one of the exercise machines shown in FIG. 19, he will then enter a personal identification number such as his birthdate on the keyboard, such as the keypad 46 shown in FIG. 17 of the exercise machine. To prevent conflicts where there are users with identical birthdates, instructions can be displayed on the monitor 112 to instruct the member to add an additional digit to his birthdate so that a conflict in identification can be avoided. After this identification information is transmitted from the exercise equipment to the computer 102, the computer 102 will transmit set-up information to the equipment based on the predetermined exercise program. At this point the member will press the asterisk key on the keypad 46 to initiate his exercise program on the exercise machine. It should be noted that the member will also have the option of performing an exercise program of his own selection by using the equipment in its normal stand alone mode of operation by not selecting the asterisk key. When the exercise program has been completed, data representing the member's performance will be transmitted to the computer 102 and stored in the memory 108 as part of the user's historical performance data.

Historical data stored in memory 108 for the aerobic exercise equipment can include: the program selected (e.g., hill profile, random or manual); exercise level as a monthly average; length of program as a monthly average; and average speed in miles per hour on a monthly basis. For the weight equipment this data can include: program selections such as set program repetitious with "heavy" negative feature; set-up weights as a monthly average; total weights lifted as a monthly average; and the average range of motion as a monthly average. General information relating to use of the exercise equipment for the last twelve months can also be stored such as: the average weekly usage for each type of equipment and daily usage of each type of equipment for the current month. Along with performance data, personal data could include: weight which can be obtained from the scale 142; height; resting heart rate; body measurements; and percent body fat, all of which can also be stored in the memory 108. In addition FIT test scores, such as those generated by the Lifecycle ® 9500 Aerobic Trainer mentioned above, can also be automatically transmitted by the exercise equipment to the computer 102 and stored in the memory 108. Preferably the above-described data can be displayed on the monitor 112 graphically as 12 point data, one point for each month.

The system of FIG. 19 has a number of other very useful features. For example, the monitor 112 can be used to display information of general interest to the members when it is not being used to initiate a program by one of the members. Also the monitor 112 can be used by club management to poll each of the exercise machine diagnostic programs to determine if there is a fault in the machine or get a listing of the fault codes for that machine for the last 30 days. Accounting statistics can also be periodically transmitted from each machine to the computer 102 and stored in the memory 108. These statistics can include for each machine: total hours of use; total number of workouts on that machine; average use per day and the distribution of exercise programs selected by members. This usage statistical information can then be used by the computer 102 to generate preventive maintenance messages on the display which would instruct the club management as to what preventive maintenance routines should be performed on which machines.

The system of FIG. 19 additionally includes a group race controller 144 . . . 150 for the various types of aerobic exercise equipment, including: the exercise bicycles 122 and 124; the treadmills 126 and 128; the stepclimbers 130 and 132; and the rowing machines 134 and 136. A description of the operation of race controllers is provided above in connection with FIGS. 1-18. In this embodiment of the invention the race controllers 144 . . . 150 operate as generally described above but they are also connected to the computer 102 as shown in FIG. 19. This permits the transfer of race information to the computer 102 which can be stored in memory 108 for later display on the monitor 112. Also by this arrangement, it is possible to down load new race parameters to each of the controllers 144 . . . 150 such that races can be modified from the health club controller.

We claim:

1. An information, communication and display system for use with a plurality of exercise machines for the purpose of permitting the machines to be raced against one another, comprising:
    input means for each exercise machine for accepting race input data;
    memory means for storing programs and data;
    main control means, responsive to said input means and said programs stored in said memory means, for controlling a simulated race between two or more exercise machines, generating graphic images of said race, and calculating race data including elapsed time, distance and calories consumed;
    display means for displaying said graphic images including an indication of the location of each of the racers, and for displaying data including said race input data and said race data;
    receiving means for each exercise machine for receiving data from said main control means; and
    means for interconnecting and transmitting data between said main control means and said receiving means of each of the exercise machines using a broadcast, which includes the elapsed time of said race, to prepare each exercise machine for a subsequent poll for data from said machine, and a polling cycle divided into a plurality of time slots corresponding to time-driven interrupts generated by said main control means, with a time-slot assigned to each exercise machine during which said main control means polls each respective exercise machine and receives data from said machine.

2. The system of claim 1 further including means whereby any one or more of the exercise machines not participating in a race may be used in an independent mode of operation.

3. The system of claim 1 wherein said graphic images include a display of the start of the race including a starter firing a starting pistol.

4. The system of claim 1 wherein said graphic images include a display of the finish of the race including an image of the winner breaking a finish line tape with the winner's number or other identification displayed on the image of the winner.

5. The system of claim 1 wherein the display means, in response to the main control means, periodically alternates the graphic display during a race between an overview of a race course showing the actual position of the racers and a side view showing the relative position of the racers.

6. The system of claim 1 wherein the exercise machines are stationary bicycles.

7. The system of claim 6 wherein the bicycles have means for varying the speed and resistance of the bicycle in response to a gear selected by the user via the input means.

8. The system of claim 1 wherein the exercise machines are rowing machines.

9. The system of claim 1 wherein the exercise machines are treadmills.

10. The system of claim 1 wherein the exercise machines are stair-climbing machines.

11. The system of claim 1 wherein the exercise machines are cross-country skiing machines.

12. The system of claim 1 wherein the graphic images include advisories of approaching variations in the resistance of said exercise machines.

13. The system of claim 1 further including means for permitting additional exercise machines to join a race in progress.

14. The system of claim 13 further including means whereby one of the exercise machines which has completed or stopped participating in a race may subsequently reenter the race in progress.

15. The system of claim 1 wherein the number of time slots is greater than the number of exercise machines, and the excess time slots are reserved for use by the main control means for generating graphics and other background tasks.

16. The system of claim 1 further comprising means to drop an exercise machine from a race if said machine fails to respond after a specified number of polling cycles.

17. The system of claim 1 further including means to prevent more than one exercise machine from transmitting data to said main control means at the same time.

18. The system of claim 1 wherein the main control means, in response to a handicap entered via the input means, calculates a velocity multiplier ranging from 0 to 15%, and uses said multiplier to vary the resistance of said exercise machines.

19. The system of claim 1 wherein in response to a zero velocity signal from an exercise machine, indicating that a user has stopped driving the machine, said main control means initiates a pause mode for a selected period of time during which a racer may resume driving the machine and reenter the race in progress.

20. The system of claim 19 wherein said display means, in response to the pause mode initiated by said main control means, displays a warning to the user to resume driving the exercise machine or be dropped from the race.

21. The system of claim 1 wherein said memory means contains programmed variable resistance profiles and said main control means transmits said profile information to the exercise machines.

22. The system of claim 21 wherein the exercise machines include means responsive to said main control means for adjusting the resistance force of the exercise machines proportionately to the grade of said resistance profiles.

23. The system of claim 1 wherein the exercise machines contain means responsive to said main control means for adjusting the resistance force of the machines with speed to simulate wind resistance.

24. The system of claim 1 further including means to prevent more than one exercise machine from transmitting data to said main control means at the same time.

* * * * *